(12) United States Patent
Pradhan et al.

(10) Patent No.: US 6,977,587 B2
(45) Date of Patent: Dec. 20, 2005

(54) LOCATION AWARE DEVICE

(75) Inventors: Salil Pradhan, Santa Clara, CA (US); Chandrakant D. Patel, Fremont, CA (US); Mark T. Smith, San Mateo, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 204 days.

(21) Appl. No.: 10/620,272

(22) Filed: Jul. 9, 2003

(65) Prior Publication Data

US 2004/0008113 A1  Jan. 15, 2004

(30) Foreign Application Priority Data

Jul. 11, 2002 (JP) ............................. 2002-202962

(51) Int. Cl.[7] .............................. G08B 1/08; G08B 1/22
(52) U.S. Cl. ......................... 340/539.26; 340/825.49; 340/539.22; 340/539.1; 340/539.23; 340/825.36; 342/450
(58) Field of Search .......................... 340/539.29, 933, 340/505, 903, 539.1, 539.13, 539.2, 539.17, 340/539.22, 531, 536, 572.1, 3.1, 5.61, 5.92, 340/825.36, 825.49, 539.26; 342/118, 450, 342/451, 458; 701/200, 207; 235/384, 385; 705/22, 28

(56) References Cited

U.S. PATENT DOCUMENTS

| | | | |
|---|---|---|---|
| 4,041,470 A | * | 8/1977 | Slane et al. .................... 701/35 |
| 5,651,517 A | * | 7/1997 | Stevens et al. ............. 246/2 R |
| 6,493,649 B1 | | 12/2002 | Jones et al. |
| 2003/0033032 A1 | * | 2/2003 | Lind et al. .................... 700/52 |
| 2004/0028023 A1 | * | 2/2004 | Mandhyan et al. ......... 370/351 |

OTHER PUBLICATIONS

Ainsworth, Diane, "'Smart' sensors promise savings in electricity costs", Berkeleyan, www.berkeley.edu/news/berkeleyan/2001/06/07_smart.html, Jun. 15, 2001.

* cited by examiner

*Primary Examiner*—Donnie L. Crosland

(57) ABSTRACT

A device having a signal module configured to transmit a first type of signal and a second type of signal and to receive the first type of signal and the second type of signal. The device also includes a timer and a controller configured to operate the signal module and timer. The controller is operable to determine a location of the device with respect to another device based upon the time elapsed between transmission and receipt of the first type of signal and transmission and receipt of the second type of signal.

54 Claims, 8 Drawing Sheets

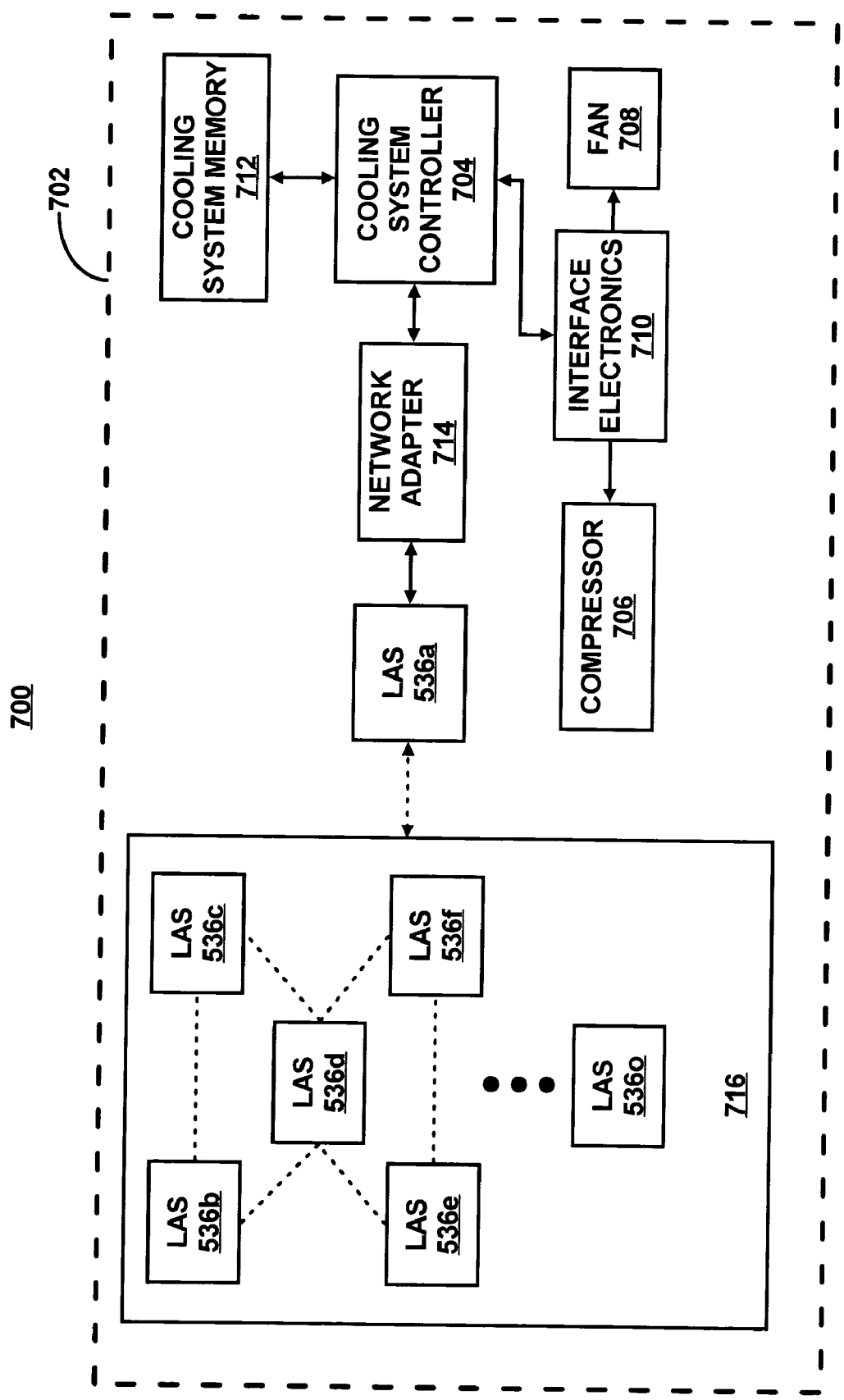

LOCATION AWARE DEVICE

BACKGROUND OF THE INVENTION

A data center may be defined as a location, e.g., room, that houses computer systems arranged in a number of racks. A standard rack may be defined as an Electronics Industry Association (EIA) enclosure, 78 in. (2 meters) wide, 24 in. (0.61 meter) wide and 30 in. (0.76 meter) deep. Standard racks may be configured to house a number of computer systems, e.g., about forty (40) systems, with future configurations of racks being designed to accommodate up to eighty (80) systems. The computer systems typically include a number of components, e.g., one or more of printed circuit boards (PCBs), mass storage devices, power supplies, processors, micro-controllers, semi-conductor devices, and the like, that may dissipate relatively significant amounts of heat during the operation of the respective components. For example, a typical computer system comprising multiple microprocessors may dissipate approximately 250 W of power. Thus, a rack containing forty (40) computer systems of this type may dissipate approximately 10 KW of power.

The power required to transfer the heat dissipated by the components in the racks to the cool air contained in the data center is generally equal to about 10 percent of the power needed to operate the components. However, the power required to remove the heat dissipated by a plurality of racks in a data center is generally equal to about 50 percent of the power needed to operate the components in the racks. The disparity in the amount of power required to dissipate the various heat loads between racks and data centers stems from, for example, the additional thermodynamic work needed in the data center to cool the air. In one respect, racks are typically cooled with fans that operate to move cooling fluid, e.g., air, cooling fluid, etc., across the heat dissipating components; whereas, data centers often implement reverse power cycles to cool heated return air. The additional work required to achieve the temperature reduction, in addition to the work associated with moving the cooling fluid in the data center and the condenser, often add up to the 50 percent power requirement. As such, the cooling of data centers presents problems in addition to those faced with the cooling of the racks.

Conventional data centers are typically cooled by operation of one or more air conditioning units. For example, compressors of air conditioning units typically require a minimum of about thirty (30) percent of the required operating energy to sufficiently cool the data centers. The other components, e.g., condensers, air movers (fans), etc., typically require an additional twenty (20) percent of the required cooling capacity. As an example, a high density data center with 100 racks, each rack having a maximum power dissipation of 10 KW, generally requires 1 MW of cooling capacity. Air conditioning units with a capacity of 1 MW of heat removal generally requires a minimum of 300 KW input compressor power in addition to the power needed to drive the air moving devices, e.g., fans, blowers, etc. Conventional data center air conditioning units do not vary their cooling fluid output based on the distributed needs of the data center. Instead, these air conditioning units generally operate at or near a maximum compressor power even when the heat load is reduced inside the data center.

The substantially continuous operation of the air conditioning units is generally designed to operate according to a worst-case scenario. For example, air conditioning systems are typically designed around the maximum capacity and redundancies are utilized so that the data center may remain on-line on a substantially continual basis. However, the computer systems in the data center may only utilize around 30–50% of the maximum cooling capacity. In this respect, conventional cooling systems often attempt to cool components that may not be operating at a level which may cause their temperatures to exceed a predetermined temperature range. Consequently, conventional cooling systems often incur greater amounts of operating expenses than may be necessary to sufficiently cool the heat generating components contained in the racks of data centers.

Another problem associated with the cooling of data centers involves the expense and difficulty in measuring the environmental conditions, e.g., temperature, humidity, air flow, etc., within and around the racks. Although it has been found that the use of temperature sensors, e.g., thermocouples, located at various locations throughout the data center has been a relatively accurate manner of detecting temperatures, this practice has also been found to be relatively restrictive due to the difficulty and costs associated with this implementation. By way of example, the number of sensors required to detect the environmental conditions throughout the data center may require that a substantially large number of sensors be implemented.

In addition, when the racks or components of a data center are added or re-arranged, the locations of the sensors must also be moved or recalibrated. Since most conventional sensors are wired to a power source and to a network for transmitting information, the movement of the sensors may prove to be a relatively difficult task requiring a great deal of time and manual input.

SUMMARY OF THE INVENTION

According to one embodiment, the present invention pertains to A device having a signal module configured to transmit a first type of signal and a second type of signal and to receive the first type of signal and the second type of signal. The device also includes a timer and a controller configured to operate the signal module and timer. The controller is operable to determine a location of the device with respect to another device based upon the time elapsed between transmission and receipt of the first type of signal and transmission and receipt of the second type of signal.

BRIEF DESCRIPTION OF THE DRAWINGS

Features of the present invention will become apparent to those skilled in the art from the following description with reference to the figures, in which:

FIG. 7 is an exemplary block diagram for a cooling system according to an embodiment of the invention.

DETAILED DESCRIPTION OF THE INVENTION

For simplicity and illustrative purposes, the present invention is described by referring mainly to an exemplary embodiment thereof. In the following description, numerous specific details are set forth in order to provide a thorough understanding of the present invention. It will be apparent however, to one of ordinary skill in the art, that the present invention may be practiced without limitation to these specific details. In other instances, well known methods and structures have not been described in detail so as not to unnecessarily obscure the present invention.

According to embodiments of the invention, "location aware" sensors ("LAS") are designed to communicate with one another in a manner to enable wireless data transfer therebetween. These sensors are termed "location aware" because they are operable to determine their general locations with respect to other sensors and/or devices. In addition, the LAS's may be designed to be located in the vicinity of, and in certain instances, located on or within, various devices or components such that the locations of these various devices or components may also be determined. By way of example, in a data center containing a plurality of racks and vents, the LAS's may be located in the vicinities of or within the racks and vents. In this respect, determination of the general locations of the LAS's generally enables determination of the general locations of the racks and vents.

Through the use of LAS's according to embodiments of the invention, as the configuration of the data center changes, it may be substantially unnecessary to reconfigure sensors that detect environmental conditions. In addition, it may be essentially unnecessary to manually determine and categorize the components of the data center after components are added, moved, or removed. One result may be that the amount of time in rewiring sensors and categorizing or locating components of the data center may be substantially reduced, thereby reducing the costs associated with operating a data center.

Figure 1:
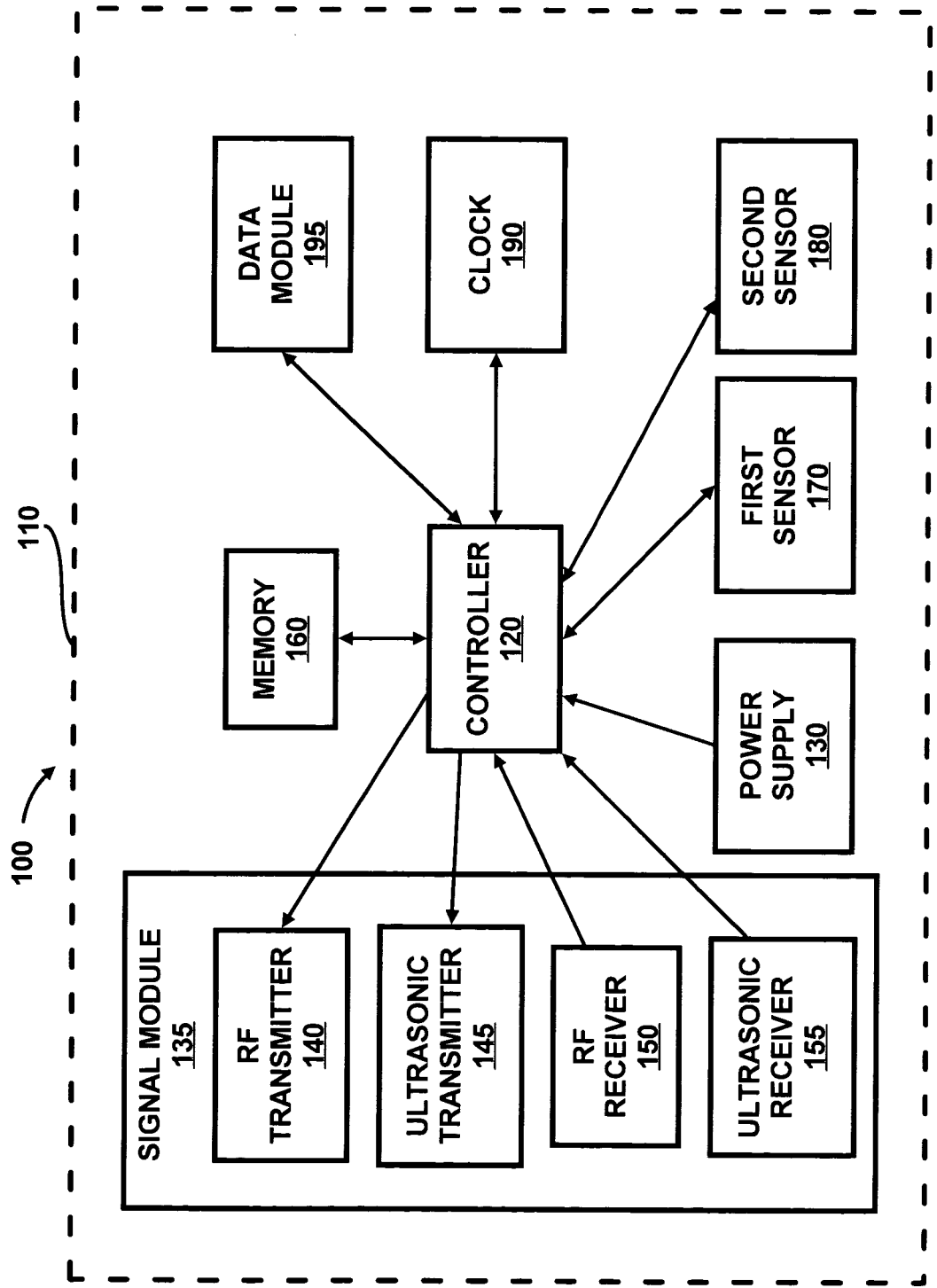
FIG. 1 is a block diagram of a location aware sensor ("LAS") according to an embodiment of the invention.

Referring first to FIG. 1, there is illustrated a block diagram 100 of a location aware sensor ("LAS") 110 according to an embodiment of the invention. The following description of the block diagram 100 is a relatively simplified manner in which the LAS 110 may be operated. In this respect, it is to be understood that the following description of the LAS 110 is but one manner of a variety of different manners in which such a location aware device may be configured. It should be readily apparent to those of ordinary skill in the art that the LAS 110 depicted in FIG. 1 represents a generalized illustration and that other components may be added or existing components may be removed or modified without departing from the scope of the invention. For example, the LAS 110 may include additional transmitters, receivers, sensors or power supplies.

A controller 120 is generally configured to control the operation of various components of the LAS 110. In this regard, the controller 120 may comprise a microprocessor, a micro-controller, an application specific integrated circuit (ASIC), and the like. The components may include a power supply 130, a signal module 135, which is shown as including an RF transmitter 140, an ultrasonic transmitter 145, an RF receiver 150, an ultrasonic receiver 155, a memory 160, a plurality of sensors 170 and 180, a timer 190, and a data module 195.

Although the signal module 135 is illustrated as comprising an RF transmitter 140, an ultrasonic transmitter 145, an RF receiver 150, and an ultrasonic receiver 155, it should be understood that the signal module 135 may comprise any reasonably suitable configuration of components without departing from the scope of the invention. For example, the signal module 135 may comprise a single device configured to transmit and receive various types of signals, e.g., a transceiver. As another example, the signal module 135 may comprise a transmitter configured to transmit two or more different types of signals and a receiver configured to receive two or more different types of signals. It is, therefore, for purposes of simplicity of illustration, and not of limitation, that the signal module 135 of the LAS 110 is shown with an RF transmitter 140, an ultrasonic transmitter 145, an RF receiver 150, and an ultrasonic receiver 155.

In operation, the controller 120 may receive power from the power supply 130 and may also control delivery of power to the other components of the LAS 110. The controller 120 may control power delivered to the transmitters 140, 145 and may also control power delivered to the receivers 150, 155. The transmitters 140, 145 and the receivers 150, 155 may be any commercially available device that is reasonably suitable to respectively send and receive information/data. Although the RF transmitter 140 and the RF receiver 150 are shown as two separate components, it should be readily understood that the functionalities of these components may be implemented by a single component, e.g., a transceiver. It should also be understood that the functionalities of the ultrasonic transmitter 145 and the ultrasonic receiver 155 may be implemented by a single component, e.g., a transceiver. Moreover, it should be understood that the functionalities of the transmitters 140, 145 may be performed by a single component and the functionalities of the receivers 150, 155 may also be performed by a single component designed to perform these functions, without departing from the scope of the invention.

The controller 120 may further control power delivery to the first sensor 170 and the second sensor 180. The first sensor 170 and the second sensor 180 may be designed to detect one or more environmental conditions (e.g., temperature, pressure, humidity, air flow, vibration, etc.). For example, with regard to temperature detection, the first sensor 170 and/or the second sensor 180 may be a thermocouple, thermistor, or otherwise configured to sense temperature and/or changes in temperature. With regard to humidity detection, the first sensor 170 and/or the second sensor 180 may be a Dunmore cell, Pope cell, or otherwise configured to sense humidity. The first sensor 170 and the second sensor 180 may be configured to relay measurements and/or detected changes in environmental conditions to the controller 120.

The controller 120 may transmit and receive data through the data module 195. The data module 195 may thus contain a transmitter and a receiver for data transfer. The transferred data may include the measurements and/or detected changes in the environmental conditions to other components, e.g., other LAS's. The transferred data may also include identification of the LAS's. The transmission and receipt of the data may be effectuated through wireless protocols, such as IEEE 801.11b, wireless serial connection, Bluetooth, etc., or combinations thereof. The signal module 135 and the data module 195 may form a communication system configured to enable communication between various LAS's 110.

Although FIG. 1 illustrates two sensors 170 and 180, it should be understood that the number of sensors is not critical to the operation of this embodiment of the invention. Instead, the LAS 110 may include any reasonably suitable number of sensors to thus measure any reasonably suitable number of environmental conditions.

The controller 120 may be interfaced with a memory 160 configured to provide storage of a computer software that provides the functionality of the LAS 110 and may be executed by the controller 120. The memory 160 may also be configured to provide a storage for containing data/information pertaining to detected environmental conditions. Furthermore, the memory 160 may be configured to store data/information pertaining to the location of the LAS 110 and/or the location of other devices configured to communicate with the LAS 110. In this respect, the direction and distance of other devices configured to communicate with the LAS 110 may be determined by the controller 120 and stored to the memory 160. The memory 160 may be implemented as a combination of volatile and non-volatile memory, such as dynamic random access memory (DRAM), EEPROM, flash memory, and the like.

The power supply 130 may comprise any reasonably suitable power source capable of supplying sufficient power to the LAS 110. Suitable power supplies may include alternating current (AC), direct current (DC), self-replenishing power supplies, and the like.

The RF transmitter 140 is configured to transmit RF signals and the ultrasonic transmitter 145 is configured to transmit ultrasonic signals. Likewise, the RF receiver 150 is configured to receive RF signals and the ultrasonic receiver 155 is configured to receive ultrasonic signals. As described in further detail hereinbelow, the transmitters 140 and 145 and the receivers 150 and 155 may be implemented for RF positioning techniques and ultrasonic localization techniques to provide a relatively accurate method of positioning the LAS 110 with respect to other components.

Although specific reference is made to an RF transmitter 140 and RF receiver 150 and an ultrasonic transmitter 145 and ultrasonic receiver 155, it should be understood that other forms of signal transmission and reception may be implemented. For example, a laser rangefinder device (not shown) may be implemented in place of or in addition to one of the RF transmitter 140 and receiver 150 and the ultrasonic transmitter 145 and receiver 155.

Figure 2:
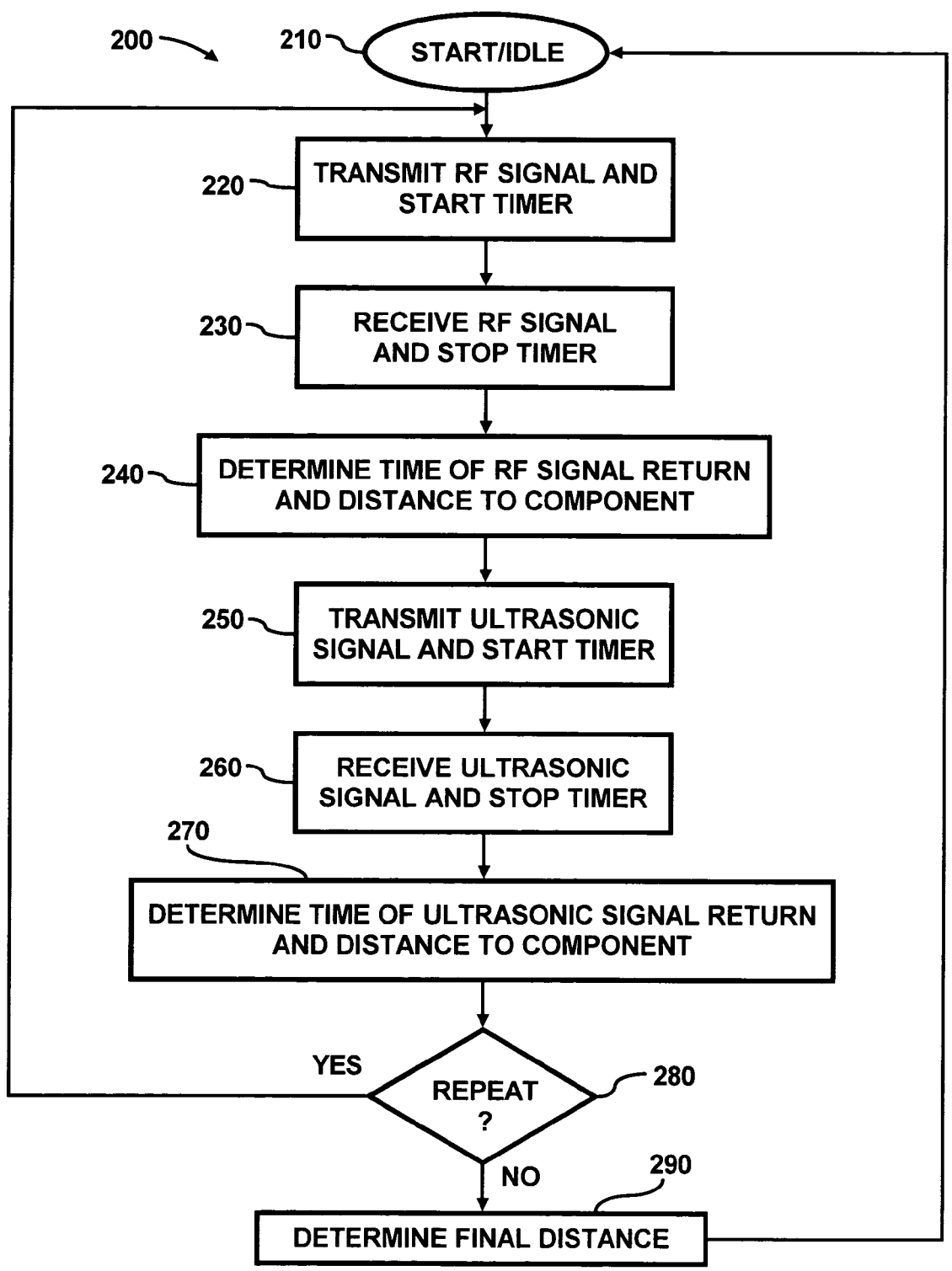
FIG. 2 is an exemplary flow diagram of an operational mode of a LAS according to an embodiment of the invention.

With reference to FIG. 2, there is illustrated an exemplary flow diagram of an operational mode 200 of a LAS 110 according to an embodiment of the invention. It is to be understood that the following description of the operational mode 200 is but one manner of a variety of different manners in which an embodiment of the invention may be operated. It should also be apparent to those of ordinary skill in the art that the operational mode 200 depicted in FIG. 2 represents a generalized illustration and that other steps may be added or existing steps may be removed or modified without departing from the scope of the invention.

The operational mode 200 may be implemented to determine the distance of a LAS with respect to another component, e.g., another LAS 110. The operational mode 200 may be initiated in response to a variety of stimuli at step 210. For example, the operational mode 200 may be initiated in response to a predetermined lapse of time, in response to receipt of a transmitted signal, and/or in response to a detected change in an environmental condition (e.g., temperature, humidity, pressure, vibration, etc.). In addition, the operational mode 200 may be initiated in response to a LAS being added, moved or removed.

At step 220, the controller 120 may cause the RF transmitter 140 to transmit an RF signal and may also cause the timer 190 to start. The RF signal may be received by a component having an RF receiver, e.g., another LAS 110. That component may return an indication of the RF signal receipt by returning another RF signal to the LAS 110, and more particularly to the RF receiver 150. Once the RF signal is received from the component, the controller 120 may cause the timer 190 to stop, as indicated at step 230. The controller 120 may then determine the time elapsed between when the RF signal was transmitted and when another RF signal was received at step 240. In addition, the controller 120 may subtract the time required for the other component to receive and transmit the RF signal. Thus, the controller 120 may be programmed with the time required by the component to receive and transmit the RF signal.

The speed at which the RF signal travels may be provided either by the RF transmitter manufacturer or may be determined through testing, e.g., by sending a signal over a predetermined distance and determining the time elapsed in traversing the predetermined distance. Thus, the distance between the LAS 110 and the component may be determined by multiplying the RF signal speed by (the elapsed time minus the time required for the component to receive and transmit the RF signal) and dividing that figure by 2.

At step 250, the controller 120 may cause the ultrasonic transmitter 150 to transmit an ultrasonic signal and may also cause the timer to start. The ultrasonic signal may be received by a component having an ultrasonic receiver, e.g., another LAS 110. That component may return an indication of the ultrasonic signal receipt by returning another ultrasonic signal to the LAS 110, and more particularly to the ultrasonic receiver 155. Once the ultrasonic signal is received from the component, the controller 120 may cause the timer 190 to stop, as indicated at step 260. The controller 120 may then determine the elapsed time between when the ultrasonic signal was transmitted and when another ultrasonic signal was received at step 270. In addition, the controller 120 may subtract the time required for the other component to receive and transmit the ultrasonic signal. Thus, the controller 120 may be programmed with the time required by the component to receive and transmit the ultrasonic signal.

The speed at which the ultrasonic signal travels may be provided either by the ultrasonic transmitter manufacturer or may be determined through testing, e.g., by sending a signal over a predetermined distance and determining the time elapsed in traversing the predetermined distance. Thus, the distance between the LAS 110 and the component may be determined by multiplying the ultrasonic signal speed by (the elapsed time minus the time required for the component to receive and transmit the ultrasonic signal) and dividing that figure by 2.

At step 280, the controller 120 may determine whether to repeat steps 220–270. The steps 220–270 may be repeated to generally enable a relatively more accurate determination of the distance between the LAS 110 and the component. That is, multiple distance determinations may be made and averaged to provide a relatively more accurate distance determination. In this regard, the controller 120 may be programmed to cause steps 220–270 to be repeated a predetermined number of times.

If the controller 120 determines that steps 220–270 have been performed the predetermined number of times, the controller 120 may make a final distance determination at step 290. Again, the final distance determination may correlate to the averaged distance determinations calculated from the times of the RF and ultrasonic signal transmissions and returns. In addition, or in the alternative, the final distance determination may correlate to the median distance from the distance determinations made at steps 240 and 270.

After the final distance determination is made at step 290, the LAS 110 may return to an idle state as indicated and described hereinabove with respect to step 210. In addition, steps 210–290 may be repeated when additional components are added or existing components are moved or removed.

Figure 3A:
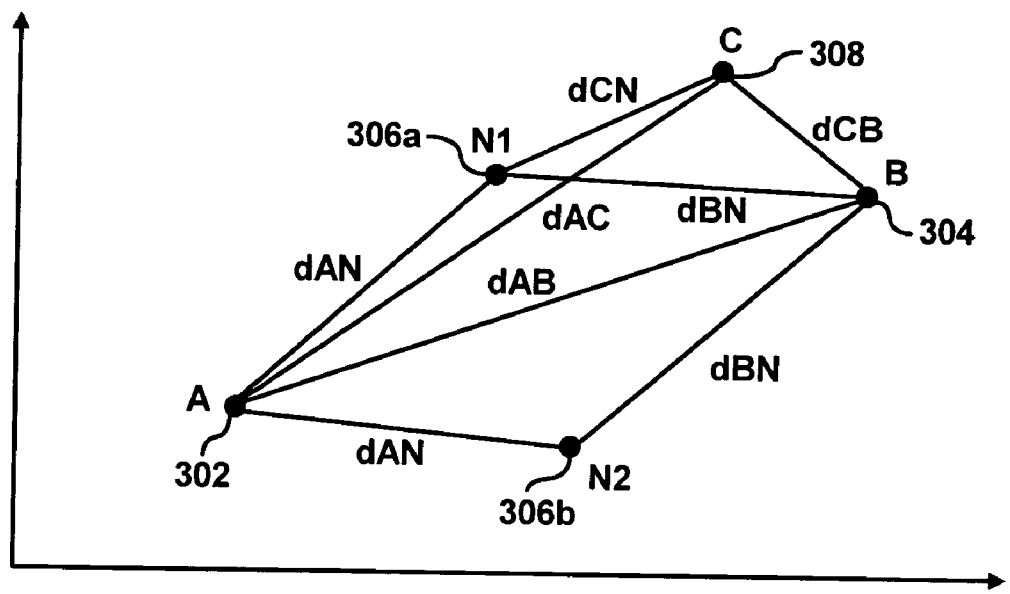
FIG. 3A illustrates a graph depicting a manner in which a LAS may determine its location with respect to other components according to an embodiment of the invention.

The location of a third component e.g., LAS 110, may be determined with respect to the LAS 110 and the component, e.g., a pair of LAS's 110, through triangulation. FIG. 3A illustrates a graph 300 depicting a manner in which the LAS 110 may determine its location with respect to other components, e.g., LAS's 110, according to an embodiment of the invention. The graph 300 illustrates a first LAS 302 (A) and a second LAS 304 (B) on a two-axis coordinate system. The graph 300 also illustrates respective possible locations of a third LAS 306. The possible locations are indicated as N1 and N2.

The location of the first LAS 302 may be defined as (Ax, Ay) and the location of the second LAS 304 may be defined as (Bx, By). In addition, the distance ($d_{AB}$) between the first LAS 302 and the second LAS 304 may be determined in accordance with the operational mode 200 described with respect to FIG. 2. Likewise, the distance ($d_{AN}$) between the first LAS 302 and the third LAS 306 and the distance ($d_{BN}$) between second LAS 304 and the third LAS 306 may be determined as stated above with respect to the operational mode 200. Once the distances $d_{AN}$ and $d_{BN}$ are determined, there are two possible locations of the LAS 306 (306a, 306b) with respect to the LAS's 302 and 304.

In this regard, the possible locations of the third LAS 306 may be defined by the following equations:

$$N1x = Ax + (kx*(Bx-Ax) - ky*(By-Ay))/d_{AB}$$

$$N1y = Ay + (kx*(By-Ay) + ky*(Bx-By))/d_{AB}$$

$$N2x = Ax + (kx*(Bx-Ax) + ky*(By-Ay))/d_{AB}$$

$$N2y = Ay + (kx*(By-Ay) - ky*(Bx-By))/d_{AB}$$

Where:

$$Kx = (d_{AB}^2 + d_{AN}^2 - d_{BN}^2)/(2*d_{AB})$$

$$Ky = (d_{AN}^2 - kx^2)^{0.5}$$

The location (distance and direction) of the LAS's 302–306, with respect to each other may be determined by determining their distances with respect to a fourth LAS 308 (C). By determining the distance between the LAS 308 and the LAS's 304 and 306, the locations (distances and directions) of the LAS's 302–308 may be determined with respect to each other.

Figure 3B:
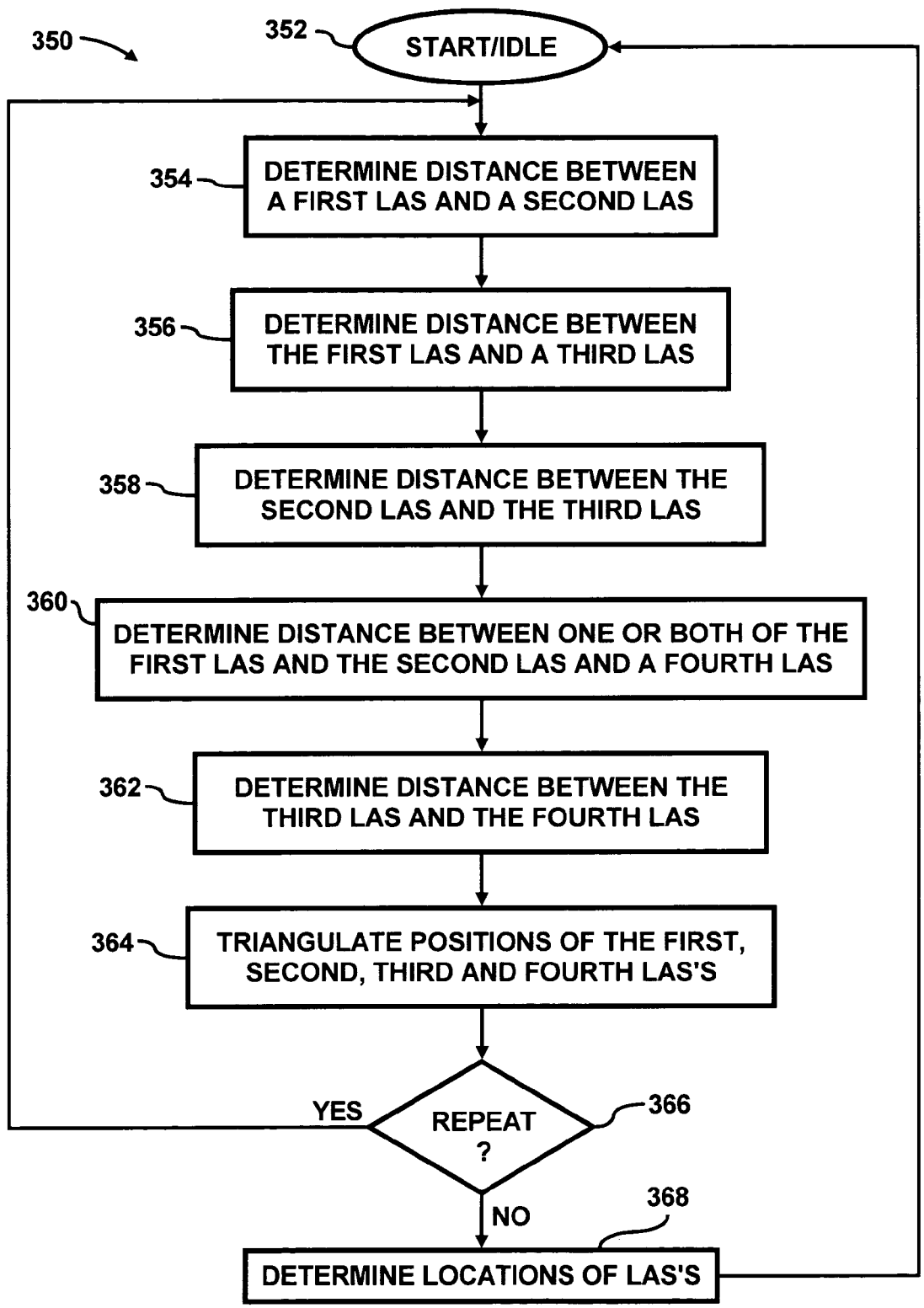
FIG. 3B illustrates an exemplary flow diagram of an operational mode depicting a manner in which the locations of a plurality of LAS's may be determined according to an embodiment of the invention.

FIG. 3B illustrates an operational mode 350 depicting a manner in which the locations of a plurality of LAS's may be determined according to an embodiment of the invention. It is to be understood that the following description of the operational mode 350 is but one manner of a variety of different manners in which an embodiment of the invention may be operated. It should also be apparent to those of ordinary skill in the art that the operational mode 350 depicted in FIG. 3B represents a generalized illustration and that other steps may be added or existing steps may be removed or modified without departing from the scope of the invention.

The operational mode 350 may be initiated in response to a variety of stimuli at step 352. For example, the operational mode 350 may be initiated in response to a predetermined lapse of time, in response to receipt of a transmitted signal, when a LAS is detected, when a previously detected LAS is undetected, etc.

After the operational mode 350 is initiated at step 352, the distance between a first LAS, e.g., LAS 302, and a second LAS, e.g., 304, may be determined at step 354. At step 356, the distance between the first LAS 302 and a third LAS, e.g. LAS 306 may be determined. In addition, the distance between the second LAS 304 and the third LAS 306 may be determined at step 358. Furthermore, the distance between one or both of the first LAS 302 and the second LAS 304 and a fourth LAS, e.g., LAS 308, may be determined at step 360. Still further, the distance between the third LAS 306 and the fourth LAS 308 may be determined at step 362.

The determination of the distances between the LAS's 302–308 may be performed in accordance with the steps listed in the operational mode 200 (FIG. 2).

At step 364, the positions of the LAS's 302–308 may be determined with respect to each other through use of triangulation techniques. That is, by knowing the distances between the LAS's 302–308, their locations may be triangulated in a manner described hereinabove.

At step 366, it may be determined whether additional LAS's are within the range of the LAS's 302–308. If there are additional LAS's, steps 354–364 may be repeated to determine their locations with respect to the other LAS's 302–308 and to each other. In this regard, steps 354–364 may be performed any number of times with respect to any number of LAS's to determine the locations of the LAS's with respect to each other.

If there are no additional LAS's detected, the locations of the LAS's may be plotted on a map or a grid at step 368. The map or grid may be stored by one or more of the LAS's. In addition or in the alternative, the map or grid of the LAS positions may be stored in the memory of a computer (e.g., memory 450 (FIG. 4), cooling system memory 712 (FIG. 7)). By way of example, if the location of one of the LAS's is known, e.g., the LAS has a fixed position, the location of that LAS may function as a fixed reference for the locations of the other LAS's. In this regard, as the configuration of the LAS's change, the changes may be tracked with relative ease.

After the locations of the LAS's are mapped at step 368, the operational mode 350 may enter an idle state. More particularly, the LAS's 302–308 may enter into a stand-by mode or otherwise shut down to conserve energy. In addition, as stated hereinabove, the operational mode 350 may be re-initiated in response to a variety of stimuli at step 352.

Figure 4:
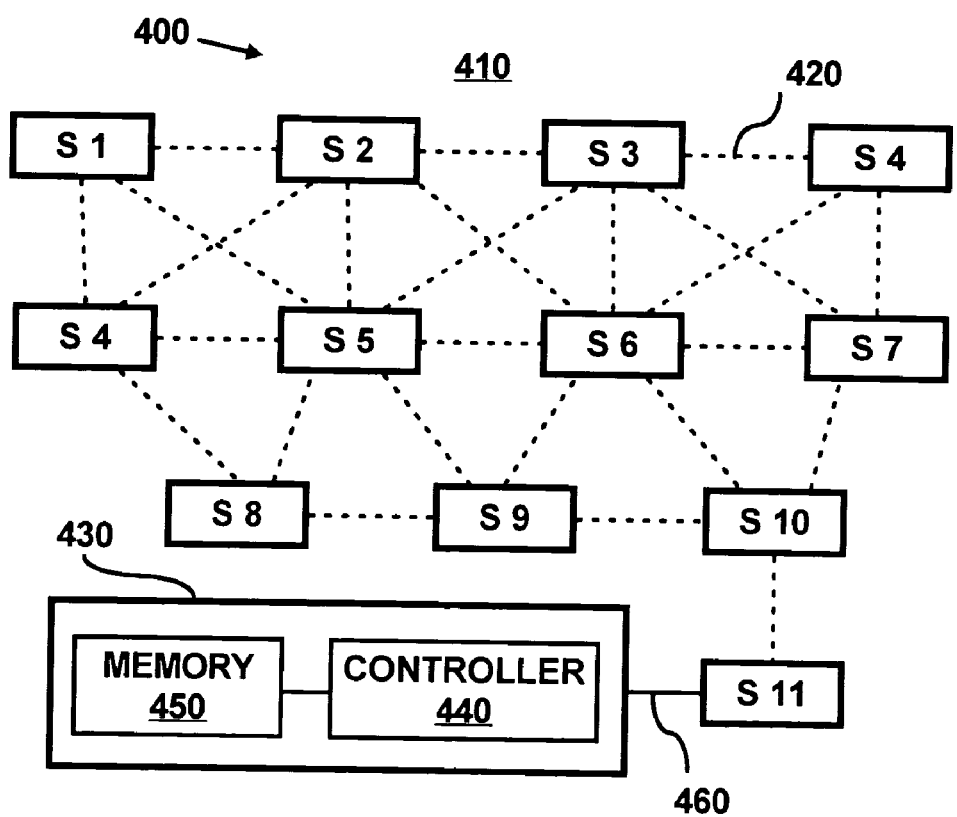
FIG. 4 is an exemplary block diagram of the interactions of a plurality of sensors S1–S11 in a system according to an embodiment of the invention.

FIG. 4 is an exemplary block diagram 400 of the interactions of a plurality of sensors S1–S11 in a system 410 according to an embodiment of the invention. The sensors S1–S11 may comprise the components and configuration of the LAS 110 illustrated in FIG. 1. Accordingly, the following description of FIG. 4 will be made with reference to the LAS 110.

As illustrated in FIG. 4, the sensors S1–S11 may form nodes of a network in which data may be transferred from essentially any one node to essentially any other node. The network may be formed via wireless communications between the sensors S1–S11, as denoted by the dashed lines 420. More particularly, and with reference to the LAS 110 in FIG. 1, the sensors S1–S11 may transmit information through transmitters 140 and 150 and receive information from other sensors S1–S11 through receivers 150 and 155.

The ability of the sensors S1–S11 to communicate to one another may be based upon the proximity of the sensors S1–S11 as well as the type of communications implemented.

In various embodiments of the invention, communication between the sensors S1–S11 may be implemented using TinyOS, Tiny Microthreading Operating System, a conventional protocol, such as transmission control protocol/Internet protocol (TCP/IP), and the like.

If one or more of the sensors S1–S11 are located at a distance that exceeds the maximum distance at which the sensors are capable of communicating with each other, information from these sensors may be relayed through "multi-hopping". The term "multi-hopping" or "multi-hop" generally refers to data being relayed through sensors that are within the maximum distance to those sensors that are outside the maximum distance. At least by virtue of the network configuration of the sensors S1–S11, information received from one or more of the sensors S1–S11 may be transmitted or multi-hopped through a sensor receiving that information. Thus, for example, sensor S5 may transmit information received from sensor S2 to sensor S9. Moreover, information from the sensors S1–S11 may be transmitted to a computer 430 either through direct communication or through multi-hopping.

The computer 430 may include a computer controller 440 and a computer memory 450. The computer 430 may include a conventional network device (e.g., server, workstation, mainframe and the like) operable to perform functions (e.g., storing and retrieving data, file management and the like) of a server in a typical client-server relationship. It should be readily apparent to those of ordinary skill in the art that the computer 430 represents a generalized illustration and that other components may be added or existing components may be removed or modified without departing from the scope of the invention. For example, the computer 430 may include a disk drive, monitor, keyboard, and the like.

The computer controller 440 is generally configured to control the operation of the computer 430. In this regard, the computer controller 450 may comprise a microprocessor, a micro-controller, an application specific integrated circuit (ASIC), and the like. The computer controller 440 may receive input data from a user via a keyboard or a disk drive (not shown). The computer controller 440 may also receive input from the sensor S11 and may store received input in the memory 450.

As shown in FIG. 4, the sensor S11 is illustrated as being in communication with a computer 430 via a wired connection 460. Although sensor S11 is illustrated as being in communication with the computer 430 via a wired connection, it should readily be apparent that the communication may be effected through use of a wireless connection. In addition, although a single sensor S11 is illustrated in communication with the computer 430, it should be apparent that any number of sensors may be in communication with the computer 430. In this regard, the connection between the computer 430 and one or more of the sensors S1–S11 may include one or more known networks, such as the Internet, intranet, local area network (LAN), wide area network (WAN), synchronous optical network (SONET), wireless network and the like.

The sensors S1–S11 may be configured to transmit substantially unique identifiers, e.g., serial numbers, identification tags, etc. The data module 195 may be configured to transmit the substantially unique identifiers. The sensors S1–S11 may thus be designed to determine the sensors with which they are communicating. Along with the identifiers, the sensors S1–S11 may also transmit, in a manner similar to the transmission of the identifiers, the identification of the device or component in the vicinities of the sensors S1–S11. In addition, the sensors S1–S11 may be coded with information pertaining to the components or characteristics of the components to which they are either attached or in the vicinity of the components. Thus, for example, the sensors S1–S11 may be coded with information pertaining to the various components housed within the racks of a data center and may be operable to transmit temperature information regarding the various components. As another example, in terms of vents, a characteristic of the vent, e.g., the amount of air flowing through the vent and/or the direction of air flow, may be transmitted through one or more of the sensors.

One or more of the sensors S1–S11 may also be configured to track operations of the components to which they are assigned. For example, if a sensor is assigned to monitor a rack, the sensor may monitor the temperature and power draw of the servers located in the rack. In addition, the sensor may monitor which servers are located in the rack as well as their performance characteristics. Therefore, a user may determine the locations of the servers with relative ease.

The computer memory 450 may be configured to provide storage of a computer software that provides the functionality of the computer 430 and may be executed by the computer controller 440. In this regard, the computer memory 450 may be implemented as a combination of volatile and non-volatile memory, such as dynamic random access memory (DRAM), EEPROM, flash memory, and the like. The computer memory 450 may also be configured to provide storage for containing data/information pertaining to the locations of the sensors S1–S11 and/or the locations of other devices in a manner described above. In addition, the computer memory 450 may be configured to store information pertaining to the devices near the sensors S1–S11. That is, for example, the computer memory 450 may store information pertaining to the identifiers of the sensors S1–S11. In addition, the computer memory 450 may contain information designed to correlate the unique identifiers with various components. Thus, in a data center, if a sensor S1 is located on a rack, the computer controller 440 may access the computer memory 450 to determine the components located in the rack.

Although eleven sensors S1–S11 and one computer 430 are shown in FIG. 4, it will be apparent to one of ordinary skill in the art that the number of sensors S1–S11 and computers 430 in the system 410 may be increased or decreased without departing from the scope of the invention.

As described above, the locations, e.g., distances and directions, of the sensors S1–S11 maybe triangulated between a number of sensors S1–S11. These locations may substantially be fixed based upon the respective distances of a plurality of sensors to the computer 430. For example, the computer 430 may provide a substantially fixed point of reference from which the locations of the sensors S1–S11 may be referenced.

According to an embodiment, the computer 430 may receive location information from the sensors S1–S11. The computer controller 440 may store the location information in the form of a map or a grid in the computer memory 450. The map or grid (not shown) may comprise one or both of a graphical and a tabular representation of the sensor S1–S11 locations. In this regard, the locations of the sensors S1–S11 may be relatively easily determined. Thus, when a change in temperature is detected, for example, the temperature information may be transmitted to the computer 430. The computer controller 440 may determine the location of the temperature change by correlating the sensor identifier with its location on the map or grid.

According to an embodiment of the invention, the locations of the sensors S1–S11 may be substantially absolute based on a device having a known location and that is not likely to be moved. The term, "absolute location" generally refers to the position of a device relative to a room (see, e.g., FIG. 5), a building, and/or the earth (e.g., GPS location). For example, as described hereinabove, transmission times of signals sent to other devices in the system 410 may be utilized to triangulate a relative position. Based on these relative positions and at least one known absolute location, the substantially absolute location of other sensors S1–S11 and/or devices in the system 410 may be determined.

Figure 5:
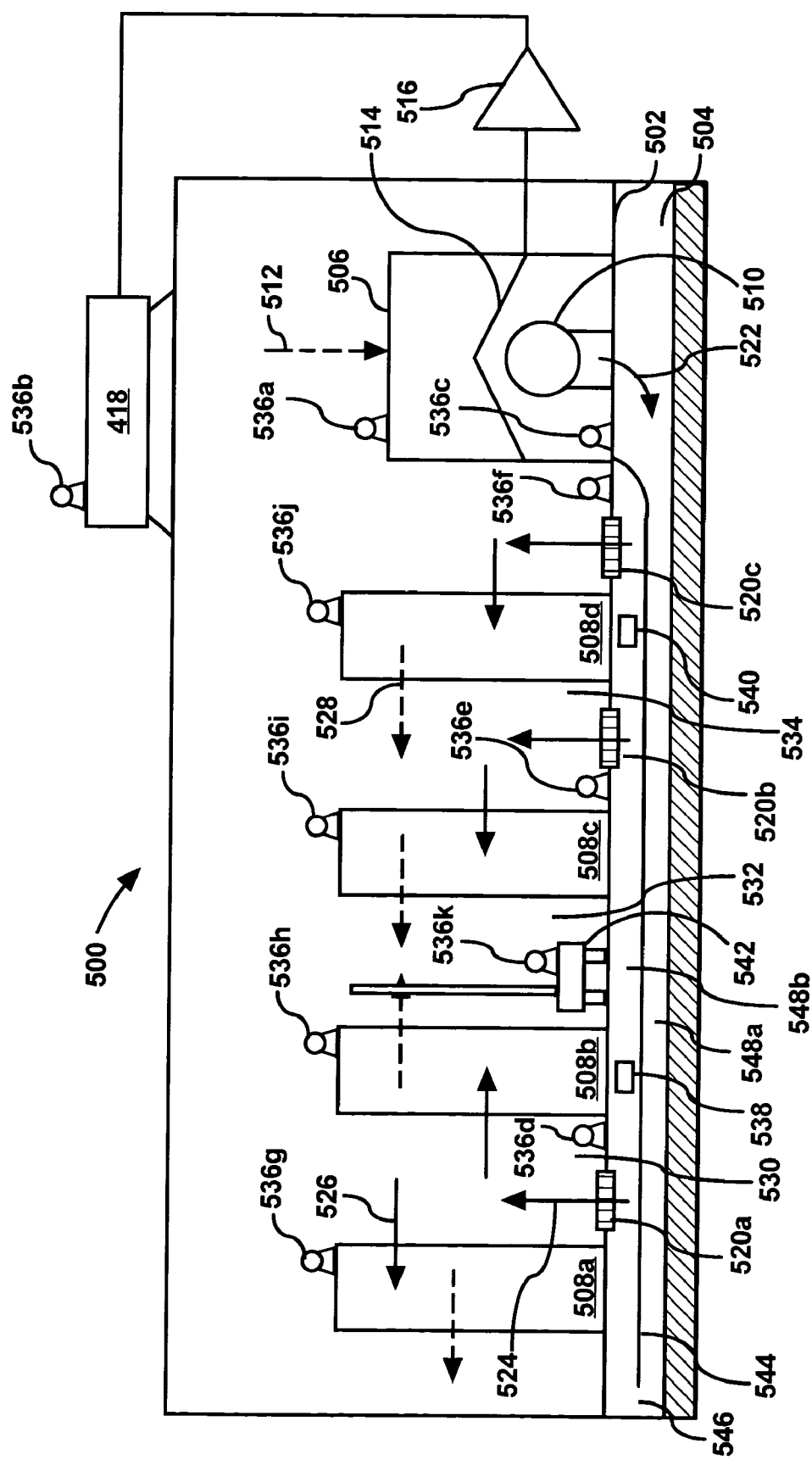
FIG. 5 is a simplified schematic illustration of a plurality of LAS's in a data center according to an embodiment of the invention.

FIG. 5 is a simplified schematic illustration of a plurality of location aware sensors in a data center 500 according to an embodiment of the invention. The use of the terms "data center" throughout the present disclosure are generally meant to denote a room or other space where one or more heat generating components may be situated. In this respect, the terms "data center" are not meant to limit the invention to any specific type of room where data is communicated nor should it be construed that use of the terms "data center" limits the invention in any respect other than its definition hereinabove.

The data center 500 includes a raised floor 502. A plurality of wires and communication lines (not shown) may be located in a space 504 beneath the raised floor 502. In addition, the space 504 may function as a plenum to deliver cooling fluid (e.g., air) from a cooling system 506 to a plurality of racks 508a–508d. Although the data center 500 is illustrated in FIG. 5 as containing four racks 508a–508d and a cooling system 506, it should be understood that the data center may include any number of racks, e.g., 100 racks, and cooling systems 506, e.g., four or more. The depiction of four racks and a cooling system 506 is for illustrative and simplicity of description purposes only and is not intended to limit the invention.

The racks 508a–508c generally house a plurality of heat generating components (not shown), e.g., processors, microcontrollers, high speed video cards, memories, semi-conductor devices, and the like. The components may be elements of a plurality of subsystems (not shown), e.g., computers, servers, etc. The subsystems and the components may be implemented to perform various electronic, e.g., computing, switching, routing, displaying, and the like, functions. In the performance of these electronic functions, the components, and therefore the subsystems, may generally dissipate relatively large amounts of heat. Because the racks 508a–508d have been generally known to include upwards of forty (40) or more subsystems, they may transfer substantially large amounts of heat to the cooling fluid to maintain the subsystems and the components generally within a predetermined operating temperature range.

As the air is heated in the vicinity of the racks 508a–508d, and exhausted (arrow 528) it may re-circulate and create a localized area of relatively high pressure. This may inhibit movement of relatively cool incoming air. To compensate for this phenomenon, conventional cooling systems may cool surrounding areas below the predetermined operating range. However, this may be inefficient because relatively more energy may be utilized to cool these surrounding areas below the predetermined operating range than would otherwise be required in a system with sufficient air movement. Furthermore, if the relatively hot air is drawn into the racks 508a–508d, it may not have sufficient cooling potential to maintain the subsystems and the components generally within the predetermined operating temperature range. Therefore, according to an embodiment of the invention, by substantially controlling the amount of heated cooling fluid (e.g., heated air, return air, etc.) removed from the general vicinity of the components and the subsystems located in the racks 508a–508d based upon their respective heat loads, the power consumed by the cooling system 506 to maintain the components at predetermined operating temperatures may also be controlled.

The cooling system 506 generally includes a fan 510 for supplying cooling fluid (e.g., air) into the space 504 (e.g., plenum) and/or drawing air from the data center 500 (e.g., as indicated by the arrow 512). In operation, the heated air (e.g., return air) enters into the cooling system 506 as indicated by the arrow 512 and is cooled by operation of a cooling coil 514, a compressor 516, and a condenser 518, in any reasonably suitable manner generally known to those of ordinary skill in the art. In terms of cooling system efficiency, it is generally desirable that the return air is composed of the relatively warmest portion of air in the data center 500.

Although reference is made throughout the present disclosure of the use of a fan 510 to draw heated air from the data center 500, it should be understood that any other reasonably suitable manner of air removal may be implemented without departing from the scope of the invention. By way of example, a fan (not shown) separate from the fan 510 or a blower may be utilized to draw air from the data center 500.

In addition, based upon the cooling fluid needed to cool the heat loads in the racks 508a–508d, the cooling system 506 may be operated at various levels. For example, the capacity (e.g., the amount of work exerted on the refrigerant) of the compressor 516 and/or the speed of the fan 510 may be modified to thereby control the temperature and the amount of cooling fluid flow delivered to the racks 508a–508d. In this respect, the compressor 516 may comprise a variable capacity compressor and the fan 510 may comprise a variable speed fan. The compressor 516 may thus be controlled to either increase or decrease the mass flow rate of a refrigerant therethrough. Because the specific type of compressor 516 and fan 510 to be employed with embodiments of the invention may vary according to individual needs, the invention is not limited to any specific type of compressor or fan. Instead, any reasonably suitable type of compressor 516 and fan 510 that are capable of accomplishing certain aspects of the invention may be employed with the embodiments of the invention. The choice of compressor 516 and fan 510 may depend upon a plurality of factors, e.g., cooling requirements, costs, operating expenses, etc.

It should be understood by one of ordinary skill in the art that embodiments of the invention may be operated with constant speed compressors and/or constant speed fans. In one respect, control of cooling fluid delivery to the racks 508a–508d may be effected based upon the pressure of the cooling fluid in the space 504. According to this embodiment, the pressure within the space 504 may be controlled through operation of, for example, a plurality of vents 520a–520c positioned at various locations in the data center 500. That is, the pressure within the space 504 may be kept essentially constant throughout the space 504 by selectively controlling the output of cooling fluid through the vents 520a–520c. By way of example, if the pressure of the cooling fluid in one location of the space 504 exceeds a predetermined level, a vent located substantially near that location may be caused to enable greater cooling fluid flow therethrough to thereby decrease the pressure in that location. A more detailed description of this embodiment may be found in U.S. application Ser. No. 10/303,761 filed on Nov. 26, 2002 and U.S. application Ser. No. 10/351,427 filed on Jan. 27, 2003, which are assigned to the assignee of the present invention and are hereby incorporated by reference in their entireties.

In addition, or as an alternative to the compressor 516, a heat exchanger (not shown) may be implemented in the cooling system 506 to cool the fluid supply. The heat exchanger may comprise a chilled water heat exchanger, a centrifugal chiller (e.g., a chiller manufactured by YORK), and the like, that generally operates to cool air as it passes over the heat exchanger. The heat exchanger may comprise a plurality of air conditioning units. The air condition units may be supplied with water driven by a pump and cooled by a condenser or a cooling tower. The heat exchanger capacity may be varied based upon heat dissipation demands. Thus, the heat exchanger capacity may be decreased where, for example, it is unnecessary to maintain the cooling fluid at a relatively low temperature.

In operation, cooling fluid generally flows from the fan 510 into the space 504 (e.g., plenum) as indicated by the arrow 522. The cooling fluid flows out of the raised floor 502 and into various areas of the racks 508a–508d through a plurality of dynamically controllable vents 520a–520c as indicated by the arrows 524. The vents 520a–520c are termed "dynamically controllable" because they generally operate to control at least one of velocity, volume flow rate and direction of the cooling fluid therethrough. A more detailed description of the dynamically controllable vents 508a–508d may be found in co-pending U.S. application Ser. No. 09/970,707, filed on Oct. 5, 2001, which is assigned to the assignee of the present invention and is incorporated by reference herein in its entirety. In addition, specific examples of dynamically controllable vents 520a–520c may be found in co-pending U.S. application Ser. No. 10/375,003, filed on Feb. 28, 2003, which is assigned to the assignee of the present invention and is incorporated by reference herein in its entirety.

As the cooling fluid flows out of the vents 520a–520c, the cooling fluid may flow into the racks 508a–508d as generally indicated by the arrows 526. As the cooling fluid flows through the racks 508a–508d, the cooling fluid may become heated by absorbing heat dissipated from heat generating components located in the racks 508a–508d. The heated cooling fluid may generally exit the racks 508a–508d as indicated by the arrows 528.

As shown in FIG. 5, the areas between the racks 508a–508d may comprise cool aisles 530, hot aisles 532, or a combination thereof 534. The cool aisles 530 are those aisles that include the vents 520a–520c and thus receive cooling fluid for delivery to the racks 508a–508d. The hot aisles 532 are those aisles that receive air heated by the heat dissipating components in the racks 508a–508d.

In addition, various sections of each of the racks 508a–508d may also receive substantially individualized amounts of cooling fluid. By way of example, if the bottom halves of the racks 508a and 508b are operating at maximum power, thereby dissipating a maximum level of heat load, and the upper halves are operating at little or no power, the vent 520a, may be configured to enable cooling fluid flow therethrough to have a relatively high volume flow rate with a relatively low velocity. In this manner, the cooling fluid may operate to generally supply greater cooling to the lower halves of the racks 508a and 508b, whereas the upper halves may receive relatively lesser amounts of cooling fluid. In addition, if the upper halves of the racks 508c and 508d are operating at approximately 50 percent of their maximum power, and the lower halves are operating at little or no power, the vent 520b may be configured to enable cooling fluid flow therethrough to have a relatively low volume flow rate with a relatively high velocity. In this manner, the cooling fluid flow may have sufficient momentum to adequately reach and cool the upper halves of the racks 508c and 508d.

Moreover, as the cooling requirements vary according to the heat loads in the racks 508a–508d, along with the subsequent variations in the volume flow rate of the cooling fluid, the cooling system 506 may also vary the amount of cooling fluid supplied to the racks 508a–508d. As an example, if the heat load in the racks 508a–508d generally increases, the cooling system 506 may operate to increase one or more of the supply and temperature of the cooling fluid. Alternatively, if the heat load in the racks 508a–508d generally decreases, the cooling system 506 may operate to decrease one or more of the supply and temperature of the cooling fluid.

The vents 520a–520c thus generally provide localized or zonal control of the cooling fluid flow to the racks 508a–508d. Whereas, the cooling system 506 generally provides global control of the cooling fluid flow. In one respect, by virtue of the zonal and global control of the cooling fluid, the amount of energy consumed by the cooling system 506 in maintaining the components within the racks 508a–508d within a predetermined operating temperature range may substantially be reduced in comparison with conventional data center cooling systems.

As part of the zonal and global control of the cooling fluid temperature and its delivery to the components in the racks 508a–508d, a plurality of location aware sensors ("LAS") 536a–536j may be situated at various locations throughout the data center 500. As stated hereinabove, the LAS's 536a–536j are designed to communicate with one another in a manner to enable wireless data transfer therebetween. In one respect, the LAS's 536a–536j are capable of determining their locations with respect to one another through transmission and receipt of signals and through triangulation techniques. In another respect, the LAS's 536a–536j are also capable of detecting one or more environmental conditions (e.g., temperature, pressure, humidity, air flow velocity and direction, etc.). The LAS's 536a–536j are operable to communicate the detected environmental conditions with one another and a cooling system controller (e.g., cooling system controller 704, FIG. 7).

A LAS 536a is shown in the vicinity of a housing of the cooling system 506. The LAS 536a may detect, for example, the air flow entering into the cooling system 506 as well as the temperature of the cooling coil 514. Additional LAS's 536b and 536c are shown in the respective vicinities of the condenser 518 and the fan 510. The LAS 536b may detect operations of the condenser 518, such as, the efficiency of the heat transfer between the refrigerant from the cooling system 506 and the ambient air. The LAS 536c may detect the temperature and flow of the cooling fluid flowing out of the fan 510. The detected conditions from the LAS's 536a–536c may be transmitted to a cooling system controller to enable the cooling system controller to vary operation of the cooling system 506.

A plurality of LAS's 536d–536f are shown in the respective vicinities of the vents 520a–520c. The LAS's 536d–536f may be configured to detect one or more environmental condition, e.g., temperature, pressure, cooling fluid flow volume, velocity, direction, and the like, in the areas around the respective vents 520a–520c. The LAS's 536d–536f may also be configured to detect operations of the vents 520a–520c. The LAS's 536d–536f may wirelessly communicate the detected information to the cooling system controller, e.g., cooling system controller 704 (FIG. 7). In addition, or alternatively, the LAS's 536d–536f may receive information from the cooling system controller. In this respect, the LAS's 536d–536f may control operations of the vents 520a–520c. Thus, for example, in response to information received from the cooling system controller, the LAS's 536d–536f may control the vents 520a–520c to vary the cooling fluid flow through the vents 520a–520c.

In addition, or as a further alternative, the LAS's 536d–536f may receive signals directly from other LAS's, e.g., LAS's 536g–536k, and operate to vary the flow of cooling fluid through the vents 520a–520c. By way of example, when the temperature around a portion of a rack, e.g., rack 508a, exceeds a predetermined temperature range, the LAS 536g may transmit a signal to the LAS 536d to increase delivery of cooling fluid to that rack. In this regard, the LAS's 536g–536k may detect one or more environmental condition in the areas of respective racks 508a–508d. In addition, the LAS's 536g–536j may be in communication with components within the racks 508a–508d. That is, for example, the LAS's 536g–536j may detect the temperatures of the components in the racks 508a–508d. The LAS's 536g–536j may use the detected temperatures to determine locations within the racks 508a–508d requiring cooling fluid delivery. For example, the LAS 536g may determine that greater amounts of cooling fluid are needed to cool components located on an upper half of the rack 508a.

The LAS's 536g–536j may also track or monitor the operation of the components. If the component comprises a server, the LAS's 536g–536j may monitor the server load and make a determination of the anticipated heat dissipation from that server based upon the server load. The anticipated heat loads may be implemented in determining the cooling fluid flow needed through a particular rack as well as in determining whether and to what extent loads may be transferred or re-routed to substantially optimize energy efficiency in cooling the components in the racks 508a–508d. The transfer of load is described in co-pending U.S. application Ser. No. 10/122,010, filed on Apr. 24, 2002, which is assigned to the assignee of the present invention and is hereby incorporated by reference in its entirety.

Although the LAS's 536a–536j are illustrated as being located in the vicinities of the various devices in the data center 500, it is within the purview of the invention that some or all of the LAS's 536a–536j may be located within the various devices. In addition, some or all of the LAS's 536a–536j may be formed integrally with the various devices. For example, the LAS's 536c–536f may be formed as respective parts of the vents 520a–520c.

In addition, although the devices illustrated in the data center 500 comprise the LAS's 536a–536j, it should be understood that other types of sensors may be implemented in addition to the LAS's 536a–536j. For example, one or more wired or wireless sensors may be implemented to detect at least one environmental condition. In this instance, the one or more wired or wireless sensors may be configured to communicate with one or more of the LAS's 536a–536j and various controllers, e.g., vent controller, cooling system controller, and the like. By way of example, a temperature sensor 538 may comprise a wired sensor configured to detect the temperature of the cooling fluid in the space 504 and a pressure sensor 540 may comprise a wired sensor configured to detect the pressure within the space 504. The temperature sensor 538 and the pressure sensor 540 may be configured to communicate wirelessly with the cooling system controller or one or more of the LAS;s 536a–536j.

According to another embodiment of the invention, a mobile device 542 may be provided to gather or measure at least one environmental condition (e.g., temperature, pressure, air flow, humidity, location, etc.) in the data center 500. More particularly, the mobile device 542 may be configured to travel around the racks 508a–508d to determine the one or more environmental conditions at various locations throughout the data center 500. A more detailed description of the mobile device 542 and its operability may be found in co-pending U.S. application Ser. No. 10/157,892, filed on May 31, 2002, which is assigned to the assignee of the present invention and is hereby incorporated by reference in its entirety.

As described in U.S. application Ser. No. 10/157,892, the mobile device 542 may be a self-propelled mechanism configured for motivation around the racks of a data center. In addition, the mobile device 542 includes a plurality of sensors configured to detect one or more environmental condition at various heights. The mobile device 542 is also designed to transmit the environmental condition information to a cooling system controller which may utilize the information in determining delivery of cooling fluid to various racks located in the data center.

According to an embodiment of the invention, a LAS 536k may be attached to the mobile device 542 or it may be formed as part of the mobile device 542. The LAS 536k may be configured for wireless communication with other LAS's 536a–536j. In this regard, the location of the mobile device 542, and more particularly the LAS 536k, with respect to one or more other LAS's 536a–536j, may be monitored. In addition, the LAS 536k may be in communication with the plurality of sensors located on the mobile device 542 and may be configured to transmit the information from the plurality of sensors to the cooling system controller.

The transmission of information from the LAS 536k to the cooling system controller may be accomplished through mutlti-hop routing of the information via one or more of the other LAS's 536a–536j, depending upon the location of the mobile device 542 with respect to the cooling system controller. That is, for example, if the mobile device 542 is located substantially near the cooling system controller to generally enable direct communication therewith, then a direct wireless link may be implemented. Otherwise, if the mobile device 542 is not located within range of the cooling system controller, then the information from the mobile device 542 may be communicated to the cooling system controller through multi-hop routing.

According to another embodiment, the mobile device 542 may receive environmental information from a LAS, e.g., LAS 536a–536j. For example, the LAS may transmit a temperature measurement to the mobile device 542 indicating a hot spot, e.g., a location where the temperature is substantially above normal, in the data center 500. The mobile device 542 may alter its course to travel to the detected hot spot to verify the temperature measurement by the LAS.

Figure 6A:
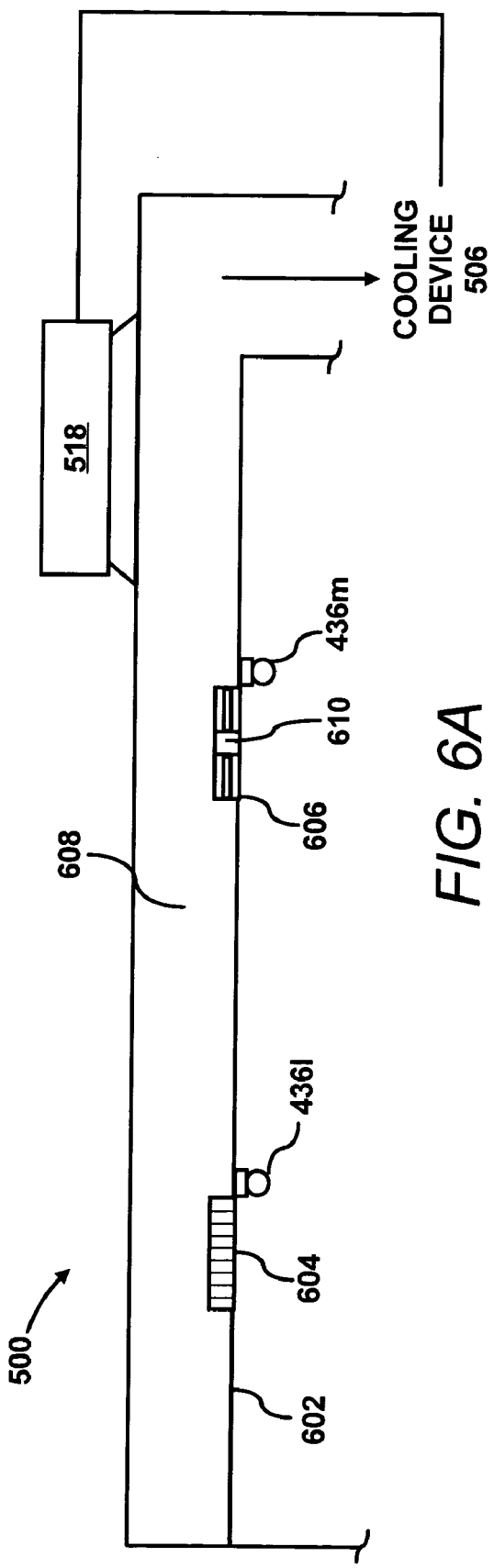
FIGS. 6A and 6B are cross-sectional side views of an upper portion of a data center according to embodiments of the invention.

FIG. 6A is a cross-sectional side view of an upper portion of a data center 500 according to an embodiment of the invention. According to this embodiment, the data center 500 may include a lowered ceiling 602. Dynamically controllable returns 604 and 606 may be situated along the lowered ceiling 602 to generally enable controlled removal of heated air from the data center 500. To facilitate removal of air from the data center 500, the returns 604 and 606 may include a fan 610. A more detailed description of the returns 604 and 606 and manners of their operability may be found in co-pending U.S. application Ser. No. 10/262,879, filed on Oct. 3, 2002, which is assigned to the assignee of the present invention and is hereby incorporated by reference in its entirety.

As described in the application Ser. No. 10/262,879, the space 608 between the lowered ceiling 602 and the ceiling of the data center 500 may function as a plenum through which air may be returned to the cooling system 506.

LAS's 536l and 536m may be located in respective vicinities of the returns 604 and 606 or the LAS's 536l and 536m may be formed as parts of the returns 604 and 606. The LAS's 536l and 536m may be designed to detect one or more environmental condition in the vicinities of the returns 604 and 606. In addition, the LAS's 536l and 536m may be designed to detect the flow of air through the returns 604 and 606. This information may be utilized in the operational control of the returns 604 and 606 as described in the application Ser. No. 10/262,879.

The LAS's 536l and 536m may be configured for wireless communication with other LAS's, e.g., one or more of the LAS's 536a–536k. In this regard, the locations of the returns 604 and 606 with respect to various components in the data center 500 may be determined and monitored in manners described hereinabove. More particularly, the locations of the various devices may be determined and monitored through locating the LAS's 536l and 536m, with respect to one or more other LAS's 536a–536k in manners described hereinabove.

In addition, the LAS's 536l and 536m may transmit information pertaining to the detected conditions to the LAS's 536a–536k. In one respect, the cooling system 506 may utilize the information from the LAS's 536l and 536m to control cooling fluid conditions (e.g., temperature, volume, etc.). In addition, or in the alternative, the LAS's 536l and 536m may receive information, e.g., environmental conditions, from one or more of the LAS's 536a–536k. The returns 604 and 606 may utilize this information in determining the control of direction and volume flow rate of air flowing therethrough. For example, return 604 may receive information from the LAS 536g. Thus, the return 604 may increase the volume flow rate of the return air flow therethrough when a LAS, e.g., LAS 536g, detects an increase in the temperature of the air in its vicinity. Alternatively, the return 604 may decrease the volume flow rate of the return air flow therethrough when a LAS, e.g., LAS 536g, detects a decrease in the temperature of the air in its vicinity.

Figure 6B:
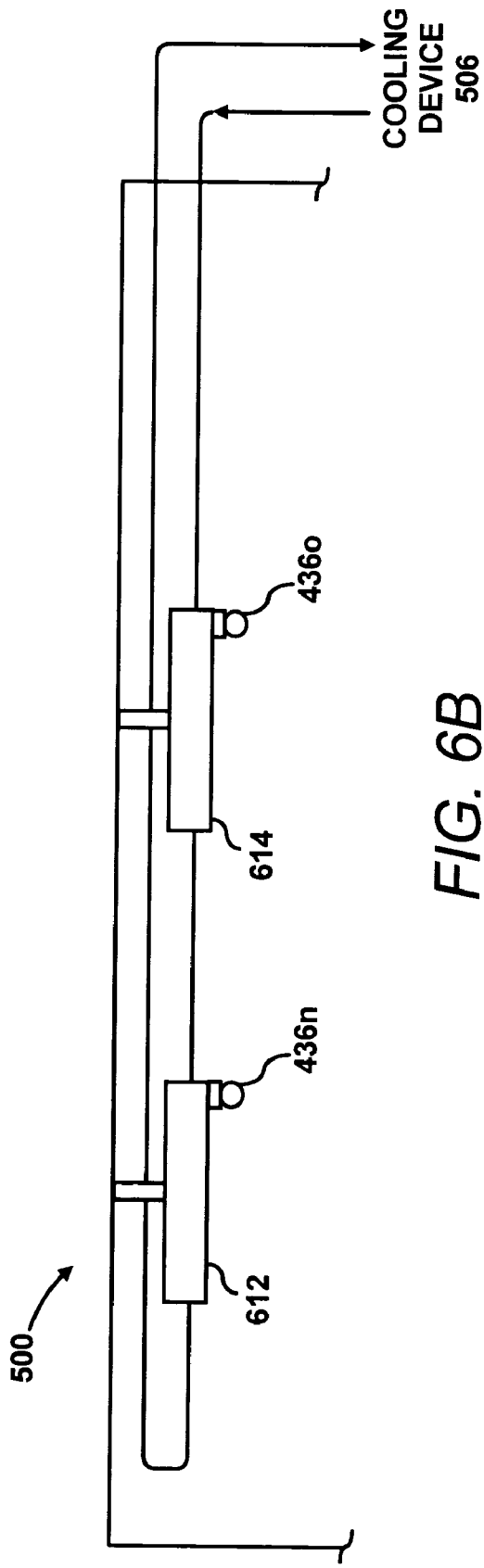

FIG. 6B is a cross-sectional side view of an upper portion of a data center 500 according to a further embodiment of the invention. According to this embodiment, heat exchanger units ("HEU") 612 and 614 may be provided in the data center 500. The HEU's 612 and 614 are disclosed and described in co-pending U.S. application Ser. No. 10/210,040, filed on Aug. 2, 2002, which is assigned to the assignee of the present invention and is hereby incorporated by reference in its entirety. As described in the application Ser. No. 10/210,040 the HEU's 612 and 614 generally operate to receive heated air from the racks 508a–508d, cool the received air, and deliver the cooled air back to the racks 508a–508d in a substantially controlled manner.

As also illustrated in FIG. 6B, the HEU's 612 and 614 include respective LAS's 536n and 536o. The LAS's 536n and 536o may be located in the respective vicinities of the HEU's 612 and 614 or the LAS's 536n and 536o may be formed as parts of the HEU's 612 and 614. The LAS's 536n and 536o may be designed to detect one or more environmental condition in the vicinities of the HEU's 612 and 614.

In addition, the LAS's 536n and 536o may be designed to detect the flow of air through the HEU's 612 and 614. This information may be utilized in the operational control of the HEU's 612 and 614 as described in the application Ser. No. 10/210,040.

The LAS's 536n and 536o may be configured for wireless communication with other LAS's 536a–536k. In this regard, the locations of the HEU's 612 and 614, with respect to other devices in the data center 500 may be determined and monitored in a manner described hereinabove. More particularly, the locations of the various devices may be determined and monitored based upon the detected locations of the LAS's 536n and 536o with respect to one or more other LAS's 536a–536k.

In addition, the LAS's 536n and 536o may transmit information pertaining to the detected conditions around the HEU's 612 and 614 to the LAS's 536a–536k. In one respect, the cooling system 606 may utilize the information from the LAS's 536n and 536o to control cooling fluid conditions (e.g., temperature, volume, etc.). In this instance, the amount of cooling fluid and/or the temperature of the cooling fluid delivered to the HEU's 612 and 614 may substantially be controlled.

In addition, or in the alternative, the LAS's 536n and 536o may receive information, e.g., environmental conditions, from one or more of the LAS's 536a–536k. The HEU's 612 and 614 may utilize this information in determining the control of direction and volume flow rate of air flowing therethrough. For example, the HEU 612 may receive information from the LAS 536g. Thus, the HEU 612 may increase the volume flow rate of the air flow directed to a rack, e.g., rack 508a, when the LAS 536g detects an increase in the temperature of the air in its vicinity. Alternatively, the HEU 612 may decrease the volume flow rate of the air flow directed to rack 508a when the LAS 536g detects a decrease in the temperature of the air in its vicinity.

With reference again to FIG. 5, according to an embodiment of the present invention, the cooling fluid supply for flow through the vents 520a–520c may be maintained at a relatively uniform pressure. In this respect, the space 504 may include a divider 544. The divider 544 may extend substantially along the entire length of space 504, i.e., in the direction generally perpendicular to the plane of FIG. 5. The divider 544 may also extend from the cooling system 506 to substantially the end of the space 504 to thus create a gap 546 between a side edge of the divider 544 and a side surface of the space 504. The divider 544 generally divides the space 504 into two relatively separate chambers 548a and 548b. The first chamber 548a is in fluid communication with the outlet of the fan 510. The second chamber 548b is in fluid communication with the first chamber 548b substantially through the gap 546. In this respect, the cooling fluid flow originating from the fan 510 must travel substantially the entire width of the space 504, i.e., through the first chamber 548a, for the fluid flow to enter into the second chamber 548b.

The cooling fluid in the second chamber 548b may be maintained at a substantially uniform static pressure by virtue of the manner in which the cooling fluid is introduced into the second chamber 548b. The rate at which the cooling fluid is supplied into the first chamber 548a by the fan 510 may cause a relatively large amount of turbulence in the cooling fluid located in the first chamber 548a. The turbulence is generally greatest at the outlet of the fan 510 and generally decreases as the distance from the outlet increases. By virtue of the distance the cooling fluid must travel to enter into the second chamber 548b, the cooling fluid may have substantially stabilized, thus enabling the cooling fluid entering into the second chamber 548b to be relatively calm. In this respect, the divider 544 operates to provide a relatively consistent cooling fluid pressure supply for the vents 520a–520c.

The pressure sensor 540 may measure the pressure of the cooling fluid located in the second chamber 548b. As described hereinabove, the pressure sensor 540 may comprise a LAS. In this respect, the pressure sensor 540 may detect any discernable changes in the pressure of the cooling fluid located within the second chamber 548b and relay that information to a cooling system controller (not shown) and/or to other LAS's 536a–536o. The cooling system controller may operate to alter the output of the fan 510 in response to the detected changes in pressure. Therefore, operation of the fan 510 may be related to the cooling requirements of the racks 508a–508d and the amount of energy required to supply the racks 508a–508d with cooling fluid may be substantially optimized. In one respect, only that amount of energy required to substantially cool the components contained in the racks 508a–508d may be expended, which may correlate to a substantial energy savings over known cooling systems.

In addition, the vents 520a–520c may receive information from the temperature sensor 538 and the pressure sensor 540. The vents 520a–520c may use this information in controlling the flow of cooling fluid therethrough. Furthermore, by virtue of the self-locating and self-assembling features of the LAS's located in the vicinities of the vents 520a–520c and the sensors 538 and 540, the locations of the vents 520a–520c with respect to the sensors 538 and 540 may be determined and monitored in a relatively simple manner.

As shown in FIG. 1, the LAS's 536a–536o may comprise power supplies 130. It is within the purview of the invention that the power supply 130 may comprise the power supplies (not shown) for the components of the data center 500. That is, for example, the LAS's 536g–536j may draw power from the same power source of the servers in the racks 508a–508d. As another example, the LAS 536k may receive power from a power supply in the mobile device 542.

FIG. 7 is an exemplary block diagram 700 for a cooling system 702 according to an embodiment of the invention. It should be understood that the following description of the block diagram 700 is but one manner of a variety of different manners in which such a cooling system 702 may be operated. In addition, it should be understood that the cooling system 702 may include additional components and that some of the components described may be removed and/or modified without departing from the scope of the invention.

The cooling system 702 includes a cooling system controller 704 configured to control the operations of a cooling system, e.g., cooling system 506 (FIG. 5). The cooling system controller 704 may comprise a microprocessor, a micro-controller, an application specific integrated circuit (ASIC), and the like. The cooling system controller 704 is generally configured to operate at least one of a compressor 706 and a fan 708. In this regard, the compressor 706 may comprise a constant speed compressor, a variable speed compressor, a heat exchanger, a chilled water heat exchanger, a centrifugal chiller, and the like. More particularly, the cooling system controller 704 may be configured to vary the operation of one or more of the above-recited components to vary the amount of heat transfer from the cooling fluid to thereby vary the cooling fluid temperature.

Interface electronics 710 may be provided to act as an interface between the cooling system controller 704 and the components for operating the cooling system, e.g., the supply of voltage to vary the speed of the compressor, control of the heat exchanger (centrifugal chiller) capacity, fan speed, etc.

The cooling system controller 704 may also be interfaced with a cooling system memory 712 configured to provide storage of a computer software that provides the functionality of the cooling system, e.g., compressor, heat exchanger, fan, and the like, and may be executed by the cooling system controller 704. The cooling system memory 712 may be implemented as a combination of volatile and non-volatile memory, such as DRAM, EEPROM, flash memory, and the like. The cooling system memory 712 may also be configured to provide a storage for containing data/information pertaining to the manner in which the compressor (heat exchanger, chiller) and/or fan, may be manipulated in response to, for example, variations in the temperature of the cooling fluid and/or air flow characteristics in the data center 500.

In one respect, the capacity (e.g., the amount of work exerted on the refrigerant, for example) of the compressor 706 (heat exchanger, chiller, etc.) may be modified to thereby control the temperature of the cooling fluid. The compressor 706 (heat exchanger, chiller, etc.) may thus be controlled to either increase or decrease the mass flow rate of the refrigerant flowing therethrough depending upon changing cooling requirements. Consequently, for example, when the temperature in the data center 500 is below a predetermined range, the capacity of the compressor 706 (heat exchanger, chiller, etc.) may be reduced to substantially reduce the amount of work, and thus the amount of energy exerted on the refrigerant.

Because the specific type of compressor 706 (heat exchanger, chiller, etc.) to be employed with embodiments of the invention may vary according to individual needs, the invention is not limited to any specific type of compressor (heat exchanger, chiller, etc.). Instead, any reasonably suitable type of compressor (heat exchanger, chiller, etc.) capable of accomplishing certain embodiments of the invention may be employed with the embodiments of the invention. The choice of compressor (heat exchanger, chiller, etc.) may therefore depend upon a plurality of factors, e.g., cooling requirements, costs, operating expenses, etc.

In addition, or in the alternative, the speed of the fan 708 may be modified according to changes in cooling needs. Thus, for example, if the components of the data center 500 generate a larger amount of heat, the fan 708 speed may be increased to increase the cooling fluid delivery to those components. In addition, the invention is not limited to any specific type of fan. Instead, any reasonably suitable type of fan capable of accomplishing certain aspects of the invention may be employed with embodiments of the invention. The choice of fan may therefore be dependent upon a plurality of factors, e.g., cooling requirements, costs, operating expenses, etc.

The cooling system controller 704 may operate the compressor 704 (heat exchanger, chiller, etc.) and the fan 708 in a manner to vary the cooling fluid temperature and volume in response to various degrees of detected increases/decreases in environmental conditions within the data center 500. More particularly, a look up table (not shown) may be stored in the cooling system memory 712. By way of example, the look up table may include information pertaining to the level of compressor 706 speed (heat exchanger capacity, etc.) increase necessary for a detected increase in the temperature around the racks 508a–508d. In this respect, the compressor speed (heat exchanger capacity, etc.) may be varied substantially incrementally in response to detected changes in the environmental conditions within the data center 500.

As described hereinabove, the cooling system controller 704 may communicate with a LAS, e.g., LAS 536a. Although FIG. 7 illustrates communication between LAS 536a and the cooling system controller 704, it is within the purview of the invention that communication may be effected between any number of LAS's 536a–536o and the cooling system controller 704. Therefore, a single LAS 536a has been illustrated as being in communication with the cooling system controller 704 for the sake of simplicity. In this regard, the single LAS 536a communication with the cooling system controller 704 illustration is not intended to limit the invention in any respect. It should thus be appreciated that references to communications between the LAS 536a and the cooling system controller 704 may also be applicable to communications between any number of LAS's 536b–536o.

A network adapter 714 may be provided as an interface between the LAS 536a and the cooling system controller 704. Data may be transmitted between the LAS 536a and the cooling system controller 704. In this regard, the network adapter 714 may enable communication via a wired protocol, such as EEE 802.3, etc., wireless protocols, such as IEEE 801.11b, wireless serial connection, Bluetooth, etc., or combinations thereof.

As described hereinabove with respect to FIG. 5, the LAS 536a may communicate with a network 716 of LAS's, e.g., LAS 536b–536o. That is, the LAS's 536a–536o may communicate either directly or indirectly, e.g., through multi-hop routing, to transmit data to and from each other. In addition, information transmitted between the LAS's 536a–536o may also be transmitted to the cooling system controller 704.

The transmitted information may include information pertaining to the locations of the LAS's 536a–536o. Thus, for example, as described hereinabove, the locations of the LAS's 536a–536o may be stored in the cooling system memory 712. In addition, the LAS's 536a–536o may transmit identification information to other LAS's 536a–536o and to the cooling system controller 704. The cooling system controller 704 may thus store the locations of the LAS's 536a–536o along with their identification information in the cooling system memory 712.

As described hereinabove, the LAS's 536a–536o may be associated with various components in the data center 500. The cooling system controller 704 may store the association information in the cooling system memory 712. In addition, the LAS's 536a–536o may transmit information pertaining to the component to which they are associated to the cooling system controller 704. By way of example, the LAS 536g may transmit information indicating that it is located on the rack 508a. In addition, the LAS 536g may also transmit information indicating the servers located within the rack 508a. In this regard, the cooling system controller 704 may determine the locations of the various components within the data center 500 without requiring virtually any manual input of their locations.

Thus, for example, the cooling system controller 704 may determine which vents 520a–520c are located in the vicinities of which racks 508a–508d. In addition, the cooling system controller 704 may determine the location of the mobile device 542 with respect to other components in the data center 500. Moreover, the cooling system controller 704 may determine the locations of the returns 604, 606 and the HEU's 612, 614 with respect to the racks 508a–508d. Therefore, the cooling system controller 704 may manipulate one or more of the vents 520a–520c and the HEU's 612, 614 to enable cooling fluid to be delivered to the racks 508a–508d in a relatively efficient manner. In addition, or in the alternative, the cooling system controller 704 may operate the returns 604, 606 to enable removal of heated air from the data center 500 to generally enable cooling of the components in the racks 508a–508d in a relatively efficient manner.

Figure 8:
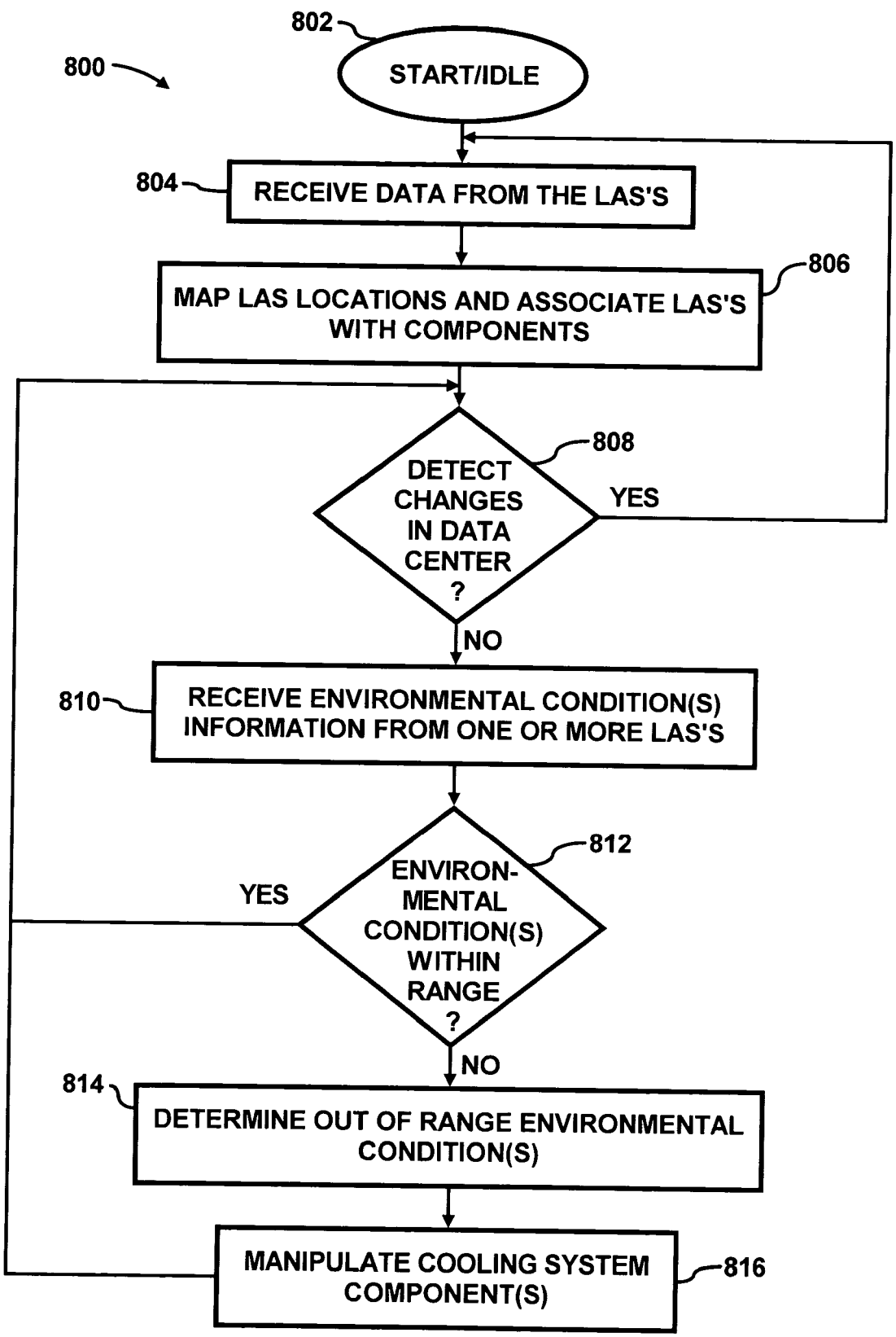
FIG. 8 shows an exemplary flow diagram of an operational mode according to an embodiment of the invention.

FIG. 8 shows an exemplary flow diagram of an operational mode 800 according to an embodiment of the invention. It should be understood that the operational mode 800 may include additional operations and that some of the operations may be removed and/or modified without departing from the scope of the invention. The following description of the operational mode 800 is made with reference to the block diagram 700 illustrated in FIG. 7, and thus makes reference to the elements cited therein.

The operations illustrated in the operational mode 800 may be contained as a utility, program, or a subprogram, in any desired computer accessible medium. In addition, the operational mode 800 may be embodied by a computer program, which can exist in a variety of forms both active and inactive. For example, they can exist as software program(s) comprised of program instructions in source code, object code, executable code or other formats. Any of the above can be embodied on a computer readable medium, which include storage devices and signals, in compressed or uncompressed form.

Exemplary computer readable storage devices include conventional computer system RAM, ROM, EPROM, EEPROM, and magnetic or optical disks or tapes. Exemplary computer readable signals, whether modulated using a carrier or not, are signals that a computer system hosting or running the computer program can be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated below may be performed by any electronic device capable of executing the above-described functions.

The operational mode 800 may be implemented to operate a cooling system, e.g., cooling system 506, vents 520a–520c, etc., to control environmental conditions within a data center, e.g., data center 500. The operational mode 800 may be initiated in response to a variety of stimuli at step 802. For example, the operational mode 800 may be initiated in response to a predetermined lapse of time, in response to receipt of a transmitted signal, and/or in response to a detected change in an environmental condition (e.g., temperature, humidity, location, etc.).

At step 804, the cooling system controller 704 may receive location information from the LAS's, e.g., LAS's 536a–536o, as described hereinabove. The cooling system controller 704 may map the locations of the LAS's at step 806. In addition, the cooling system controller 704 may associate the LAS's with respective components of the data center. The components may include racks 508a–508d, vents 420a–420c, mobile sensing device 542, returns 604, 610, HEU's 612, 614, and the like. Thus, for example, the cooling system controller 704 may associate LAS 536d with vent 520a and LAS 536g with rack 508a.

In addition to the location information received from the LAS's 536a–536o, the cooling system controller 704 may also receive identification information from the LAS's 536a–536o. That is, the LAS's 536a–536o may transmit identifying information unique to each LAS 536a–536o. The identifying information may be in the form of a serial number or other manner of identification. The cooling system controller 704 may be configured to access a database stored in the cooling system memory 712 correlating the identification information and the components in the vicinities of the LAS's 536a–536o.

In the alternative, the LAS's 536a–536o may be programmed with the components with which they are associated. Thus, for example, the LAS's 536a–536o may be programmed with this information as they are positioned in the data center 500. The LAS's 536a–536o may transmit this information to the cooling system controller 704.

In any respect, the cooling system controller 704 may map the locations of the LAS's 536a–536o and may thus also map the locations of the components. In this regard, the cooling system controller 704 may store the locations of the LAS's 536a–536o as well as the components in the cooling system memory 712. Thus, as conditions change within the data center, e.g., the components are removed, moved to different locations, or other components are added, the cooling system controller 704 may detect and chart these changes without requiring substantial manual input.

At step 808, the cooling system controller 704 may determine whether any changes in the data center have been detected. For example, if another LAS is added to the network 716, steps 804 and 806 may be repeated. In this regard, the location and identification information for that LAS may be transmitted to the cooling system controller 704 and the cooling system controller 704 may map the location of that LAS. In addition, the cooling system controller 704 may associate the LAS with a component.

If no changes are detected or concurrently with the detection of changes, the cooling system controller 704 may receive environmental condition information from one or more of the LAS's 536a–536o at step 810. The cooling system controller 704 may determine whether the one or more environmental conditions received from the LAS's 536a–536o are within a predetermined range at step 812. For example, if the cooling system controller 704 receives information from LAS 536g pertaining to the temperature of a server located in the rack 508a, the cooling system controller 704 may determine whether the temperature of the server is within a predetermined temperature range. In general, the predetermined temperature range pertains to threshold temperatures to determine whether to increase or decrease the flow of cooling air delivered to the racks. This range of operating temperatures may be set according to a plurality of factors. These factors may include, for example, the operating temperatures set forth by the manufacturers of the subsystems and components located in the racks, through testing to determine the optimal operating temperatures, etc. In addition, the predetermined range of operating temperatures may vary from one subsystem to another.

The predetermined ranges for the environmental conditions of the components in the data center 500 may be stored in the cooling system memory 712. More particularly, a look-up table, for example, may be stored in the cooling system memory 712. The look-up table (not shown) may include information listing the component and the predetermined ranges. For example, the look-up table may list the rack 508a, the servers contained in the rack 508a, the nominal operating temperatures for the servers, the nominal humidity for the servers, etc. The cooling system controller 704 may access the look-up table for the components to determine whether the detected environmental conditions are within their respective predetermined ranges.

Based upon this review, the cooling system controller 704 may determine which environmental conditions are outside the predetermined ranges and which components may be affected by these conditions at step 814. For example, the cooling system controller 704 may receive information from the LAS 536g regarding the temperature in the vicinity of the rack 508a. If the temperature is above a predetermined operating temperature range, the cooling system controller 704 may determine a manner in which one or more of the components may be manipulated to reduce the temperature around the rack 508a. In this regard, the cooling system controller 704 may determine that the rack 508a temperature may be reduced by increasing the volume flow rate of cooling fluid flowing through the vent 520a. Thus, the cooling system controller 704 may cause the vent 520a to vary the flow of cooling fluid therethrough to increase the volume flow rate of the cooling fluid at step 816.

The cooling system controller 704 may transmit instructions to the LAS's 536a–536o. One or more of the LAS's 536a–536o may be configured to operate respective components of the data center based upon information received from the cooling system controller 704. By way of example, the cooling system controller 704 may transmit an instruction through the LAS 536a to the LAS 536d to operate the vent 520a.

According to embodiments of the invention, the cooling system components may be manipulated in manners similar to those manners described in co-pending U.S. patent application Ser. No. 09/970,707. For example, as described with respect to FIGS. 3A and 3B of that document, components of the cooling system may be manipulated to afford zonal and global temperature control within the data center. In addition, cooling system operations may be based upon detected temperatures and/or pressures at various locations within the data center. In like manners, the components of the cooling system of the present invention may be manipulated to provide local and zonal temperature variations according to the principles set forth in U.S. patent application Ser. No. 09/970,707.

According to additional embodiments of the invention, the cooling system components may be manipulated in manners similar to those manners described in co-pending U.S. patent application Ser. No. 10/210,040. As described in that application, HEU's may be provided to enable generally localized receipt of air and delivery of cooling fluid to the racks of a data center. The control of the cooling fluid delivery and intake of air may be based according to detected temperatures in the vicinities of the racks. The components of the cooling system (e.g., HEU's 612, 614 (FIG. 6B)) of the present invention may be operated in likewise manners.

According to further embodiments of the invention, the cooling system components may be manipulated in manners similar to those manners described in co-pending U.S. patent application Ser. No. 10/157,892. As described in that application with respect to FIGS. 6A, 6B, 7A, and 7B, components of a cooling system may be manipulated to vary cooling fluid characteristics, e.g., temperature, pressure, volume, etc., in a data center. In addition, a mobile device may be used to detect hot spots in the data center. Environmental condition information obtained by the mobile device may be used in determining and varying the cooling fluid characteristics. The components of the cooling system of the present invention may utilize the information obtained by the mobile device, e.g., mobile device 542 (FIG. 5), of the present invention in manners similar to those described in U.S. patent application Ser. No. 10/157,892.

According to yet further embodiments of the invention, the cooling system components may be manipulated in manners similar to those manners described in co-pending U.S. patent application Ser. No. 10/262,879. As described in that application with respect to FIGS. 3A and 3B, components of a cooling system may be manipulated to vary cooling fluid characteristics, e.g., temperature, pressure, volume, etc., in a data center. In addition, a return configured to vary the flow and direction of air intake from the data center may be used to control air removal from the data center. The components of the cooling system (e.g., returns 604, 606 (FIG. 6A)) of the present invention may be operated in likewise manners.

According to yet further embodiments of the invention, the cooling system components may be manipulated in manners similar to those manners described in co-pending U.S. patent application Ser. No. 10/303,761. As set forth in that application, the plenum of a data center may be divided into various zones by controllable partitions. The pressure within the zones may be varied by operation of the controllable partitions and the controllable partitions may be manipulated in response to detected changes in temperature and/or pressure either in the data center or in the zones of the plenum. The data center, e.g., data center 500 (FIG. 5), of the present invention may be provided with the partitions described in U.S. patent application Ser. No. 10/303,761 and may operate in similar manners to those set forth in that application. In this regard, the cooling system components of the present invention may be operated in manners similar to those set forth in U.S. patent application Ser. No. 10/303, 761.

According to yet further embodiments of the invention, the cooling system components may be manipulated in manners similar to those manners described in co-pending U.S. patent application Ser. No. 10/351,427. As described in that application, air flow through vents of a cooling system may be varied according to detected pressures in the plenum of a data center. The data center, e.g., data center 500 (FIG. 5), of the present invention may include similarly configured vents and pressure sensors. In this regard, the cooling system components of the present invention may be manipulated in manners similar to those described in U.S. patent application Ser. No. 10/351,427.

After the cooling system component(s) are manipulated to attempt to compensate for the environmental condition(s) outside of the predetermined range at step 816, steps 804–816 may be repeated substantially continuously. In this regard, the operational mode 800 may comprise an iterative process designed to monitor and vary conditions within the data center to generally enable environmental conditions in the data center to be within predetermined operating ranges in a substantially continuous manner. By repeating the operational mode 800 a number of times, the environmental conditions within the data center may be substantially brought within the predetermined operating ranges.

As described in greater detail in the co-pending applications listed hereinabove, a computational fluid dynamics (CFD) tool may be implemented substantially simultaneously with the cooling system. More specifically, the CFD tool may be utilized to substantially continuously vary the operation of the cooling system to operate according to the heat loads generated in the racks. In this regard, the anticipated (e.g., based upon the power draw of the components) or actual heat loads on the racks may be inputted into the CFD tool, along with one or more of the following properties: velocity of the cooling fluid flowing through various sections of the room and the distribution of temperature and pressure of the cooling fluid in the data center. These environmental conditions may be sensed by the LAS's and transmitted to the cooling system controller.

In this regard, the CFD tool may be implemented to produce a numerical model of the room to thus determine an optimized cooling distribution within the room. A correlation of one or more of the following properties: velocity of the cooling fluid flowing through various sections of the room, distribution of temperature and pressure of the cooling fluid in the room, and the power draw into the racks, may be created based on the numerical modeling. The correlation may be used to infer thermal conditions throughout the room when only a minimum number of sensors are available during operation of the cooling system. In addition, the correlation may substantially reduce the amount of time required for the CFD tool to perform the computing operations. Moreover, the cooling system controller may use the numerical model of the cooling distribution in the data center to manipulate operations of the cooling system components. In this respect, environmental conditions within the data center may be substantially maintained within predetermined operating ranges.

By virtue of certain embodiments of the present invention, the amount of energy, and thus the costs associated with substantially maintaining environmental conditions within a data center within predetermined operating parameters, may be substantially reduced. In one respect, by operating the cooling system to supply cooling fluid substantially only as needed by the components in the racks, the cooling system may be operated at a relatively more efficient manner in comparison with conventional cooling systems. Moreover, the use of the LAS's described hereinabove generally enables a cooling system controller to determine and track the locations of various components within the data center. Therefore, as components are added, moved or removed from the data center, the cooling system controller may track these changes with relatively minimal manual input.

Moreover, the use of the LAS's to track the locations of the components as well as to sense and communicate environmental conditions enables a substantial reduction in the costs associated with operating a data center. For example, the use of LAS's substantially reduces or eliminates the need for wired sensors, which may require re-wiring as component configurations are varied in the data center.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims—and their equivalents—in which all terms are meant in their broadest reasonable sense unless otherwise indicated.

What is claimed is:

1. A device comprising:
   a signal module configured to transmit a first type of signal and a second type of signal, said signal module further configured to receive the first type of signal and the second type of signal;
   a timer; and a controller configured to operate the signal module and timer, wherein said controller is operable to determine a location of the device with respect to another device based upon the time elapsed between transmission and receipt of the first type of signal and transmission and receipt of the second type of signal.

2. The device according to claim 1, further comprising:

at least one sensor configured to detect one or more environmental conditions.

3. The device according to claim 2, wherein said one or environmental conditions comprises at least one of temperature, pressure, humidity, air flow direction, and air flow velocity.

4. The device according to claim 2, further comprising:

a data module configured to transmit detected by the at least one sensor and to receive information from the component.

5. The device according to claim 4, wherein said data module is configured to transmit identification information to the component and to receive identification information from the component.

6. The device according to claim 1, wherein said signal module comprises an RF transmitter configured to transmit an RF signal and an RF receiver configured to receive an RF signal.

7. The device according to claim 1, wherein signal module comprises an ultrasonic transmitter configured to transmit an ultrasonic signal and an ultrasonic receiver configured to receive an ultrasonic signal.

8. The device according to claim 1, wherein the signal module comprises a first transmitter configured to transmit the first type of signal and the receiver comprises a first receiver configured to receive the first type of signal, and wherein the signal module further comprises a second transmitter configured to transmit the second type of signal and a second receiver configured to receive the second type of signal.

9. The device according to claim 1, wherein the signal module comprises one or more transceivers.

10. A method of communicating between a plurality of devices, said method comprising:

transmitting a first type of signal and starting a timer, wherein said first type of signal is transmitted from a first device to a second device;

receiving said first type of signal and stopping the timer, wherein said first device receives said first type of signal from the second device;

determining the time elapsed between transmission of the first type of signal and receipt of the first type of signal;

determining the distance between the first device and the second device based upon the time elapsed between transmission and receipt of the first type of signal;

transmitting a second type of signal and starting the timer, wherein the second type of signal is transmitted from the first device to the second device;

receiving said second type of signal and stopping the timer, wherein said first device receives said second type of signal from the second device;

determining the time elapsed between transmission of the second type of signal and receipt of the second type of signal; and calculating the distance between the first device and second device based upon the time elapsed between the transmission and receipt of the first type of signal and the transmission and receipt of the second type of signal.

11. The method according to claim 10, further comprising:

repeating the transmission and receipt of the first type of signal and the second type of signal a predetermined number of times; and averaging the calculated distances based upon the elapsed times for transmission and receipt of the first type of signal and the second type of signal.

12. The method according to claim 10, wherein said step of determining the distance between the first device and the second device based upon the time elapsed between transmission and receipt of the first type of signal comprises subtracting a predetermined time required for the second device to receive and transmit the first type of signal; and wherein said step of determining the time elapsed between transmission of the second type of signal and receipt of the second type of signal comprises subtracting a predetermined time required for the second device to receive and transmit the second type of signal.

13. The method according to claim 10, further comprising:

calculating the distance between the first device and a third device;

calculating the distance between the second device and the third device;

calculating the distance between one or both of the first device and the second device and a fourth device;

calculating the distance between to third device and the fourth device; and triangulating the location of the third device with respect to the first device and the second device based upon the distance of the third device from the first device, the second device and the fourth device.

14. The method according to claim 13, further comprising:

triangulating the location of the fourth device with respect to the first device, the second device and the third device based upon the distance of the fourth device from the first device, the second device and the third device.

15. The method according to claim 14, further comprising:

plotting to locations of the devices on a map or grid.

16. The method according to claim 15, wherein said step of plotting the device locations comprises referencing at least one of said devices to a fixed point of reference.

17. The method according to claim 15, further comprising:

transmitting identification information from the first device to the second device;

transmitting identification information from the second device to the first device; and storing the identification information from the first device and the second device to thereby enable relatively simple identification of the first device and the second device.

18. A computer readable storage medium on which is embedded one or more computer programs, said one or more computer programs implementing a method of communicating between a plurality of devices, said one or more computer programs comprising a set of instructions for:

transmitting a first type of signal and starting a timer, wherein said first type of signal is transmitted from a first device to a second device;

receiving said first type of signal and stopping the timer, wherein said first device receives said first type of signal from the second device;

determining the time elapsed between transmission of the first type of signal and receipt of the first type of signal;

determining the distance between the first device and the second device based upon the time elapsed between transmission and receipt of the first type of signal;

transmitting a second type of signal and starting the timer, wherein the second type of signal is transmitted from the first device to the second device;

receiving said second type of signal and stopping to timer, wherein said first device receives said second type of signal from the second device;

determining the time elapsed between transmission of the second type of signal and receipt of the second type of signal; and calculating the distance between the first device and second device based upon the time elapsed between the transmission and receipt of the first type of signal and the transmission and receipt of the second type of signal.

19. The computer readable storage medium according to claim 18, said one or more computer programs further comprising a set of instructions for:

repeating the transmission and receipt of the first type of signal and the second type of signal a predetermined number of times; and averaging the calculated distances based upon the elapsed times for transmission and receipt of the first type of signal and the second type of signal.

20. The computer readable storage medium according to claim 18, said one or more computer programs further comprising a set of instructions for:

calculating the distance between the first device and a third device;

calculating the distance between the second device and the third device;

calculating the distance between one or both of the first device and the second device and a fourth device;

calculating the distance between the third device and the fourth device; and triangulating the location of the third device with respect to the first device and the second device based upon the distance of the third device from the first device, the second device and the fourth device.

21. The computer readable storage medium according to claim 20, said one or more computer programs further comprising a set of instructions for:

triangulating the location of the fourth device with respect to the first device, the sceond device and the third device based upon the distance or the fourth device from the first device, the second device and the third device.

22. The computer readable storage medium according to claim 21, said one or more computer programs further comprising a set of instructions for:

plotting the locations of the devices on a map or grid.

23. The computer readable storage medium according to claim 22, said one or more computer programs further comprising a set of instructions for:

referencing at least one of said devices to a fixed point of reference.

24. The computer readable storage medium according to claim 18, said one or more computer programs further comprising a set of instructions for:

transmitting identification information from the first device to the second device;

transmitting identification information from the second device to the first device; and storing the identification information from the first device and the second device to thereby enable relatively simple identification of the first device and the second device.

25. A device comprising:

means for transmitting and receiving a first type of signal;

means for transmitting and receiving a second type of signal;

means for timing the transmission and receipt of the first type of signal transmitted and received by the means for transmitting and receiving the first type of signal;

means for timing the transmission and receipt of the second type of signal transmitted and received by the means for transmitting and receiving the second type of signal; and means for calculating a distance between the device and another device based upon times obtained by the means for timing the transmission and receipt of the first type of signal and the means for timing the transmission and receipt of the second type of signal.

26. The device according to claim 25, further comprising: means for transmitting and receiving data.

27. The device according to claim 25, further comprising:

means for detecting one or more environmental conditions; and means for transmitting detected one or more environmental conditions.

28. The device according to claim 25, further comprising: means for plotting locations of one or more devices.

29. A plurality of devices comprising:

a communication system to enable communication between said device and others of said plurality of devices having communication systems;

said plurality of devices being positioned at various locations of a room, wherein said plurality of devices are configured to communicate with one another through said communication systems;

wherein said plurality of devices are configured to determine their positions with respect to others of said plurality of devices through said communication systems;

at least one sensor configured to detect one or more conditions, wherein said plurality of devices are configured to communicate the detected one or more conditions to others of said plurality of devices; and one or more of said plurality of devices being in communication with a cooling system configured to supply cooling fluid to one or more heat generating components in the room, wherein said cooling system is configured to be manipulated in response to the detected one or more conditions.

30. The plurality of devices according to claim 29, wherein said plurality of devices are configured to communicate through wireless connections.

31. The plurality of devices according to claim 29, wherein said one or more conditions comprises at least one of temperature, humidity, pressure, air flow, and vibration.

32. The plurality of devices according to claim 31, wherein said cooling system is operable to supply cooling fluid to a plurality of racks, said cooling system having a controller in communication with one or more of said plurality of devices.

33. The plurality of devices according to claim 32, wherein said cooling system comprises a cooling system controller and a variable capacity compressor, wherein said cooling system controller is configured to vary the capacity of the variable capacity compressor substantially based upon information received from the plurality of devices.

34. The plurality of devices according to claim 32, further comprising:
a mobile environmental condition sensing device having a communication device configured to communicate with said plurality of devices to enable location of said mobile environmental condition sensing device with respect to said plurality of devices.

35. The plurality of devices according to claim 34, wherein said communication device is further configured to transmit detected condition information to one or more of said plurality of devices.

36. The plurality of devices according to claim 29, wherein said cooling system comprises a cooling fluid delivery component, wherein said cooling fluid delivery component is configured to vary cooling fluid delivery based upon detected condition information received from one or more devices.

37. A method of controlling environmental conditions in a data center, said method comprising:
receiving location information from a plurality of devices configured to determine their locations with respect to others of said plurality of devices;
mapping the locations of the plurality of devices;
associating the devices with components in the data center;
receiving at least one environmental condition from one or more of the plurality of devices;
determining whether the received at least one environmental condition is within a predetermined range; and
manipulating one or more cooling system components in response to the received at least one environmental condition being outside of the predetermined range.

38. The method according to claim 37, wherein said step of associating the plurality of devices with components in the data center comprises receiving identification information from the plurality of devices and comparing the identification information with a database containing a correlation between the identification information and the components.

39. The method according to claim 37, wherein said step of associating the plurality of devices with components in the data center comprises receiving information pertaining to the association of the plurality of devices and the components from the plurality of devices.

40. The method according to claim 37, wherein said manipulating step comprises increasing the volume flow rate of cooling fluid to those components having temperatures exceeding a predetermined operating temperature range.

41. The method according to claim 37, wherein said manipulating step comprises decreasing the volume flow rate of cooling fluid delivered to those components having temperatures that fall below a predetermined operating temperature range.

42. The method according to claim 37, wherein said manipulating step comprises increasing at least one of temperature and volume flow rate of cooling fluid from a cooling system component in response to a decrease in cooling fluid supply to one or more racks falling below an increase in cooling fluid supply to the one or more racks.

43. The method according to claim 37, wherein said manipulating step comprises decreasing at least one of temperature and volume flow rate of cooling fluid from a cooling system component in response to a decrease in cooling fluid supply to one or more racks exceeding an increase in cooling fluid supply to the one or more racks.

44. The method according to claim 37, further comprising:
performing a numerical modeling of a temperature distribution and flow characteristics of the data center; and
manipulating said one or more cooling system components in response to said numerical modeling.

45. The method according to claim 44, further comprising:
implementing said numerical modeling to correlate at least two of temperature, velocity and pressure of said cooling fluid and power draw of one or more racks within said data center to thereby infer a thermal condition throughout said data center, wherein said manipulating step further comprises manipulating said one or more cooling system components in response to said inferred thermal condition.

46. A computer readable storage medium on which is embedded one or more computer programs, said one or more computer programs implementing a method of controlling environmental conditions in a data center, said one or more computer programs comprising a set of instructions for:
receiving location information from a plurality of devices configured to determine their locations with respect to others of said plurality of devices;
mapping the locations of the plurality of devices;
associating the devices with components in the data center;
receiving at least one environmental condition from one or more of the plurality of devices;
determining whether the received at least one environmental condition is within a predetermined range; and
manipulating one or more cooling system components in response to the received at least one environmental condition being outside of the predetermined range.

47. The computer readable storage medium according to claim 46, said one or more computer programs further comprising a set of instructions for:
receiving identification information from the plurality of devices and comparing the identification information with a database containing a correlation between the identification information and the components.

48. The computer readable storage medium according to claim 46, said one or more computer programs further comprising a set of instructions for:
receiving information pertaining to the association of the plurality of devices and the components from the plurality of devices.

49. The computer readable storage medium according to claim 46, said one or more computer programs further comprising a set of instructions for:
increasing the volume flow rate of cooling fluid to those components having temperatures exceeding a predetermined operating temperature range.

50. The computer readable storage medium according to claim 46, said one or more computer programs further comprising a set of instructions for:
decreasing the volume flow rate of cooling fluid delivered to those components having temperatures that fall below a predetermined operating temperature range.

51. A system for controlling environmental conditions in a data center, said method comprising:
means for locating a plurality of devices configured to determine their locations with respect to others of said plurality of devices, wherein said plurality of devices are configured to detect one or more environmental conditions;
means for mapping the locations of the plurality of devices;

means for associating the devices with components in the data center;

means for communicating the detected one or more environmental conditions:

means for determining whether the received one or more environmental conditions are within a predetermined range; and means for manipulating one or more cooling system components in response to the received one or more environmental conditions being outside of the predetermined range.

52. The system according to claim 51, further comprising:

means for transmitting and receiving identification information from the plurality of devices; and means for comparing the identification information with a database containing a correlation between the identification information and the components.

53. The system according to claim 51, further comprising:

means for receiving information pertaining to the association of the plurality of devices and the components from the plurality of devices.

54. The system according to claim 51, further comprising:

means for varying the volume flow rate of cooling fluid to those components having temperatures exceeding a predetermined operating tempauture range.

* * * * *